(12) United States Patent
Cavina

(10) Patent No.: US 8,973,741 B2
(45) Date of Patent: Mar. 10, 2015

(54) TRANSPORTING APPARATUS

(75) Inventor: Luigi Cavina, Bologna (IT)

(73) Assignee: I.M.A. Industria Macchine Automatiche S.p.A. (IT)

( * ) Notice: Subject to any disclaimer, the term of this patent is extended or adjusted under 35 U.S.C. 154(b) by 91 days.

(21) Appl. No.: 13/580,678

(22) PCT Filed: Mar. 8, 2011

(86) PCT No.: PCT/IB2011/000499
§ 371 (c)(1),
(2), (4) Date: Nov. 5, 2012

(87) PCT Pub. No.: WO2011/110925
PCT Pub. Date: Sep. 15, 2011

(65) Prior Publication Data
US 2013/0056332 A1   Mar. 7, 2013

(30) Foreign Application Priority Data
Mar. 9, 2010 (IT) .............................. BO2010A0138

(51) Int. Cl.
*B65G 19/02* (2006.01)
*B65G 19/22* (2006.01)

(52) U.S. Cl.
CPC .............. *B65G 19/02* (2013.01); *B65G 19/225* (2013.01)
USPC ....................................................... 198/731

(58) Field of Classification Search
CPC ......... B65G 19/24; B65G 19/22; B65G 19/02
USPC ....................................................... 198/795
See application file for complete search history.

(56) References Cited

U.S. PATENT DOCUMENTS

| | | | | |
|---|---|---|---|---|
| 4,159,249 A | * | 6/1979 | Schotten | 210/230 |
| 5,411,108 A | * | 5/1995 | Lobachev et al. | 180/8.7 |
| 6,425,478 B1 | * | 7/2002 | Eberle | 198/795 |
| 7,134,258 B2 | * | 11/2006 | Kalany et al. | 53/473 |
| 8,616,824 B2 | * | 12/2013 | Trebbi et al. | 414/331.06 |
| 2012/0018282 A1 | * | 1/2012 | Loecht | 198/725 |

FOREIGN PATENT DOCUMENTS

| | | |
|---|---|---|
| EP | 0708028 A1 | 4/1996 |
| WO | 03105324 A1 | 12/2003 |
| WO | 2010086060 A1 | 8/2010 |

* cited by examiner

*Primary Examiner* — Gene Crawford
*Assistant Examiner* — Thomas Randazzo
(74) *Attorney, Agent, or Firm* — Laubscher, Spendlove & Laubscher, P.C.

(57) ABSTRACT

An apparatus for transporting objects includes a guide arrangement for supporting and guiding along a movement path at least one carriage supporting a support element suitable for receiving at least one object. A movement arrangement moves the carriage along the movement path. The carriage is provided with rolling elements and the guide arrangement includes at least three guides that are parallel to one another, each of which is arranged for supporting and guiding a respective rolling element in an operative configuration of the carriage. The guides define respective movement profiles conjugated and shaped so that each rolling element abuts on the respective guide at each point of the latter along the movement path. The rolling elements are arranged at the vertices of a triangle with respect to a plane that is parallel to the guides.

15 Claims, 18 Drawing Sheets

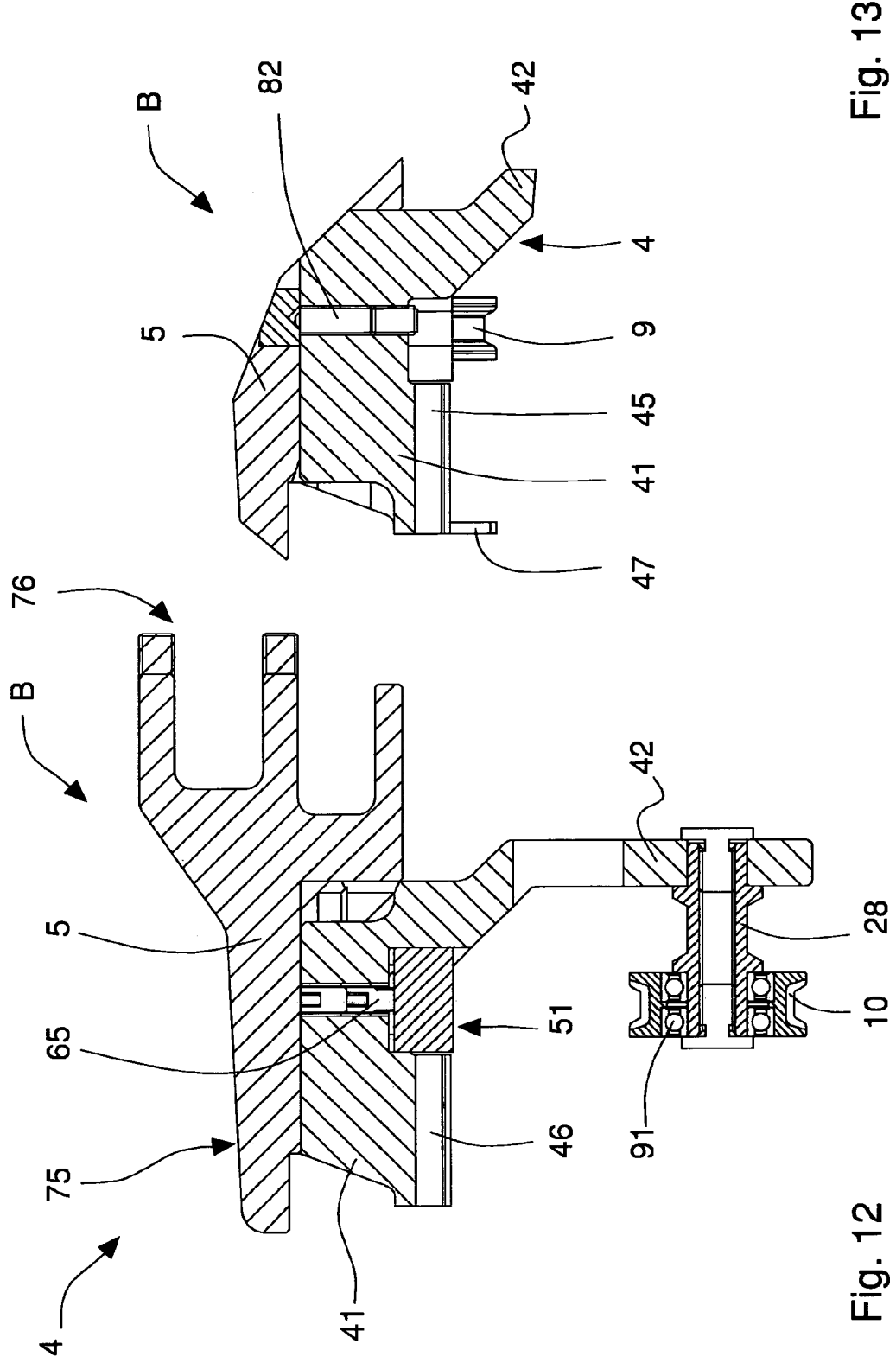

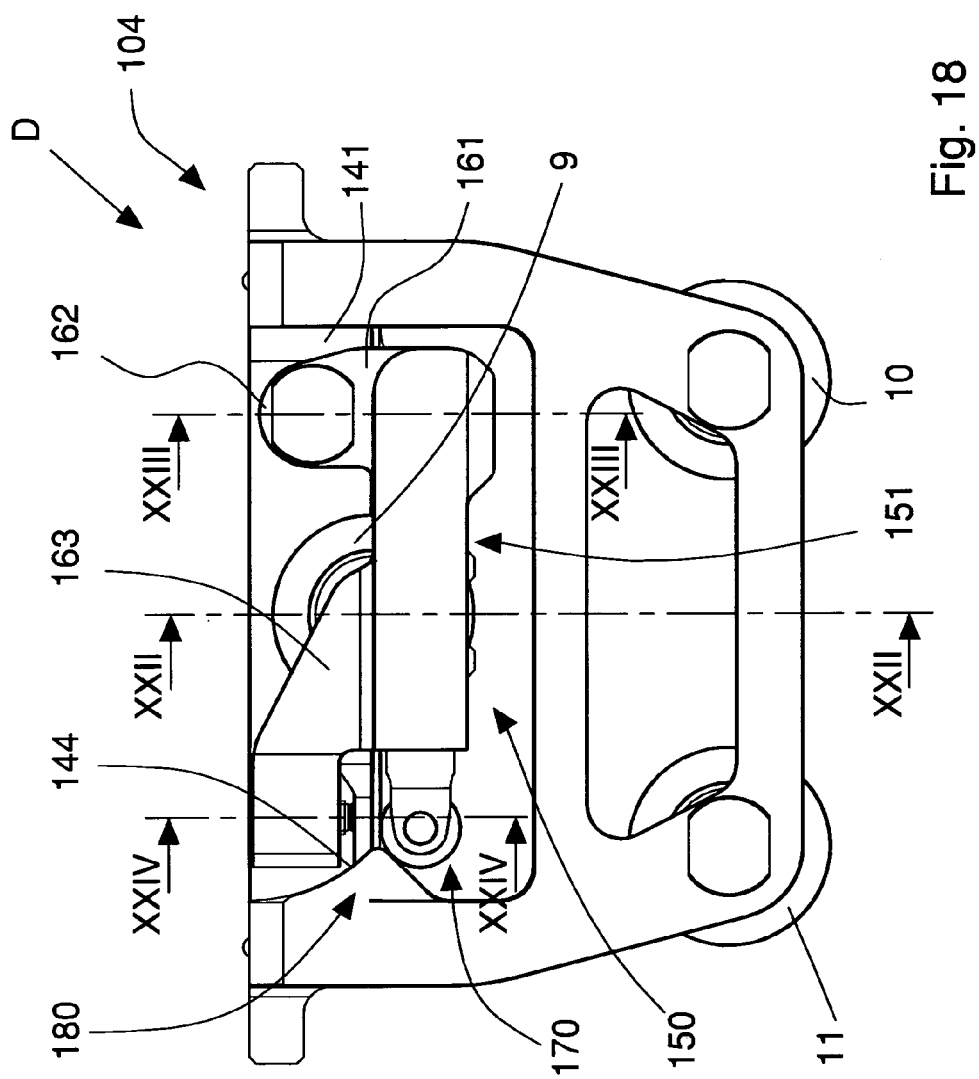
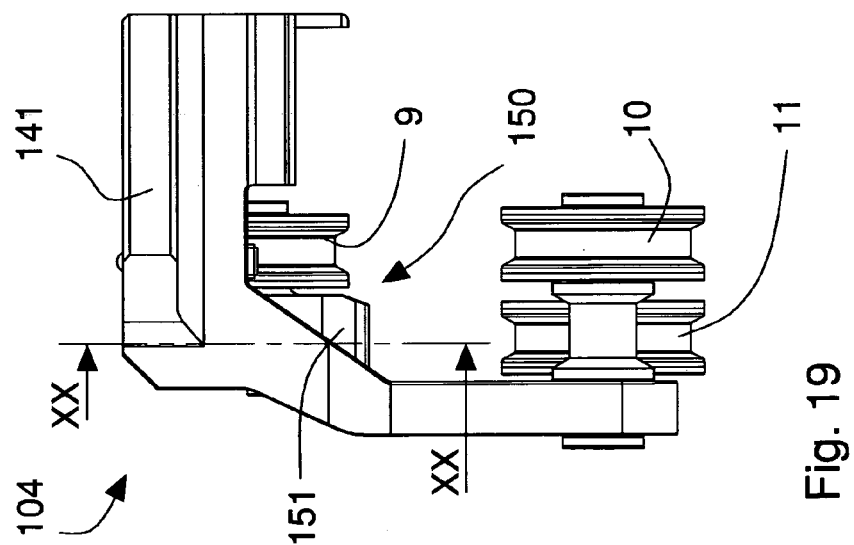

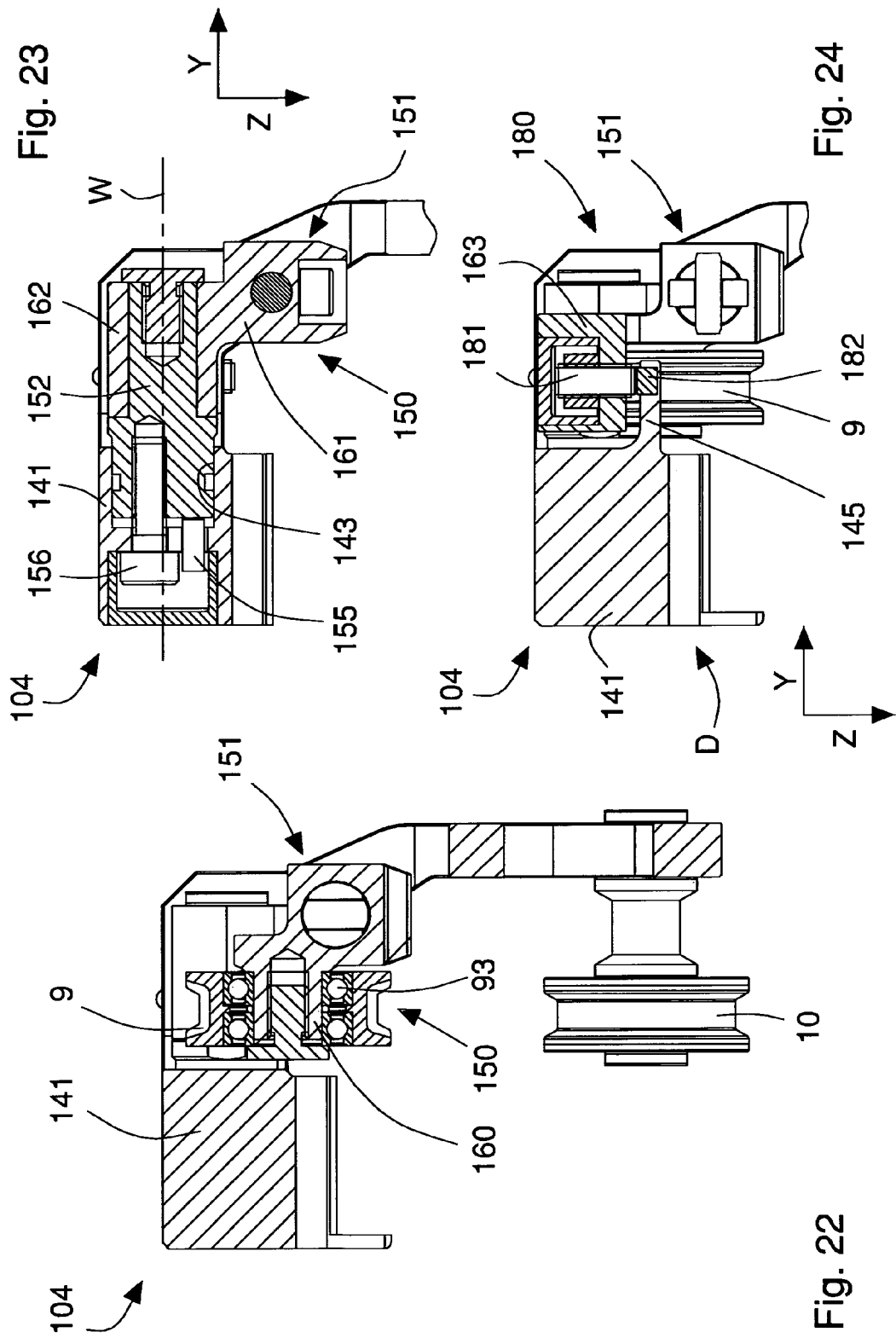

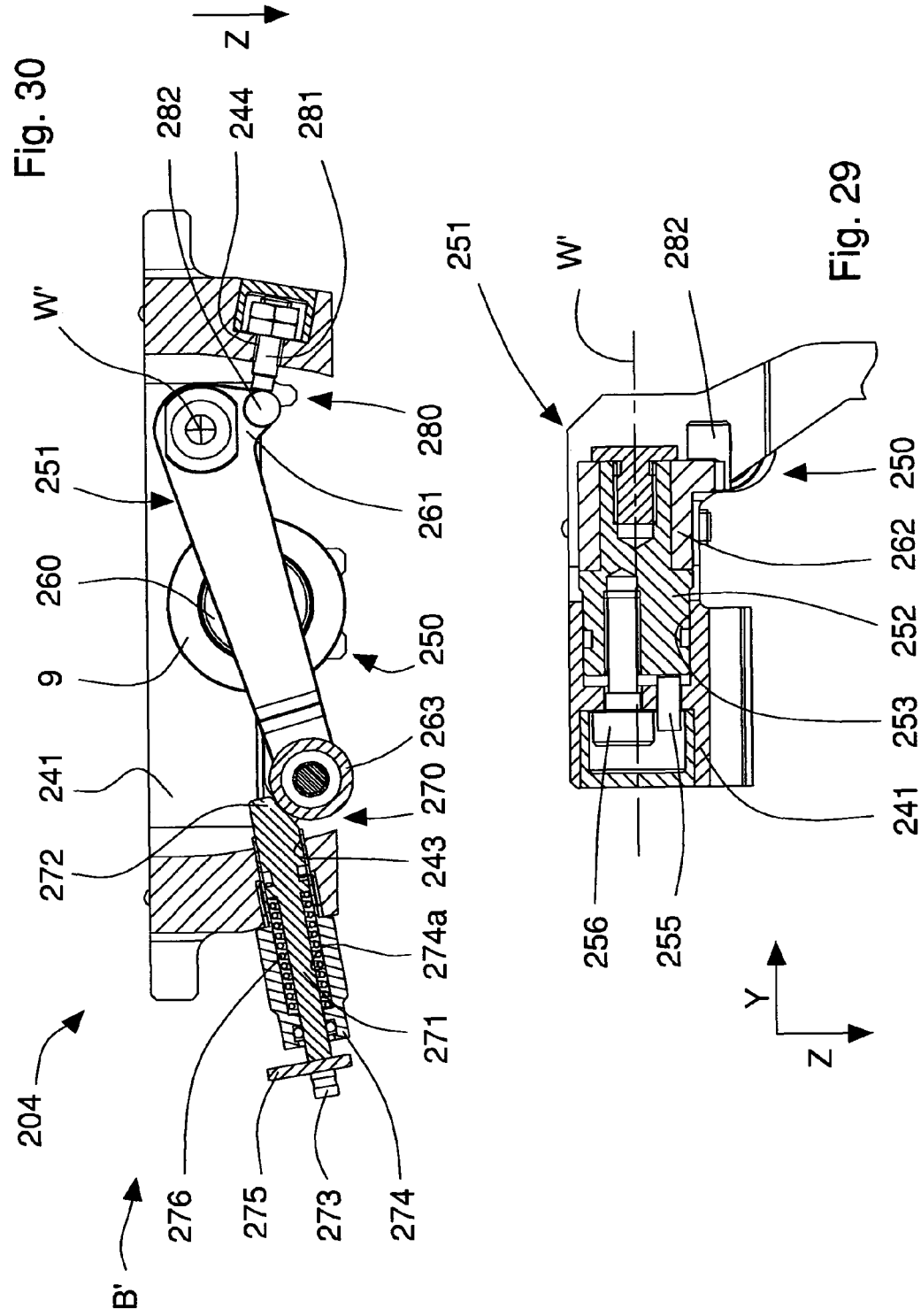

TRANSPORTING APPARATUS

This application is a §371 National Stage Application of PCT International Application No. PCT/IB2011/000499 filed Mar. 8, 2011. PCT/IB2011/000499 claims priority to IT Application No. BO2010A000138 filed Mar. 9, 2010. The entire contents of these applications are incorporated herein by reference.

BACKGROUND OF THE INVENTION

The present invention relates to transporting apparatuses for packaging machines, in particular it refers to an apparatus for moving objects, for example containers, such as bottles, phials, capsules, syringes and the like in an automatic packaging machine for pharmaceutical and/or cosmetic and/or food use.

Transporting apparatuses for known packaging machines are arranged for moving containers to be packaged through different and successive operative stations of the machine, at which a plurality of operations are performed on the containers, for example filling with a product, weighing, capping, etc.

BRIEF DESCRIPTION OF THE PRIOR ART

Known transporting apparatuses typically comprise a transport belt or strap that is closed in a loop around a driving pulley and an idle pulley and provided with support elements for the containers.

The transport belt comprises an upper movement part and a lower return part and is moved in a longitudinal advance direction by the driving pulley. The upper part and the lower part are rectilinear, parallel and superimposed, interconnected together at the end by respective curved parts that wind around the driving and idle pulley in such a manner as to define a closed-loop circuit of the transport belt.

The driving pulley and the transport belt are generally provided with teeth so as to mesh together. The meshing between driving pulley and transport belt enables the angular position of the pulley to be matched with the linear position of the belt and a phase relationship to be thus maintained between the containers and the operative stations of the machine.

The support elements, which are commonly known as "godet", are provided with seats for housing, in collaboration with one or more longitudinal abutting guides, the containers.

The support elements are generally removably connected to the transport belt by suitable hooking devices in such a manner as to be able to be assembled on and/or disassembled from the belt, for example in the case of washing and sterilisation of the transporting apparatus and/or in the case of replacement thereof for a change in container size. The transport belt drags and moves the support elements. Longitudinal guides support and guide the support elements in such a manner as to ensure precise positioning of the containers along the advance direction at the operative stations of the machine.

Sliding of the support elements on the longitudinal guides can, however, cause some drawbacks such as the formation of particles of material of the support elements and/or of the guides that may contaminate the product to be packaged, generating electrostatic charges that may affect correct operation of electric or electronic devices present in the machine and the need for motorization of significant power to drive the transport belt and overcome the sliding friction of a great number of support elements.

In order to overcome these drawbacks, transporting apparatuses are known in which the support elements are coupled with respective transport carriages connected and moved by the transport belt, and provided with rollers or wheels with a fixed axis arranged for rolling along a suitable guide or rail.

The guide forms a closed loop having a shape and dimensions that are substantially similar to those of the transport belt. The carriages typically comprise four wheels arranged in pairs and acting on opposite faces of the guide to ensure appropriate stability and positioning precision for the carriage. The wheels are generally fixed to the carriage with a defined wheelbase so as to run with reduced clearance on the guide both on the rectilinear parts and on the curved parts of the guide.

Carriages with fixed axis wheels are able to slide with reduced clearance only on rectilinear parts, or on curved parts with a constant bending radius, but not on guides comprising both rectilinear parts and curved parts or on guides with curved parts with different bending radii, unless the clearance between wheels and guides is increased unacceptably.

In order to overcome this drawback, transporting apparatuses are known in which 'steering' transporting carriages are used, i.e. transporting carriages having a pair of wheels that is mounted on a respective steering element that is able to rotate freely so as to arrange itself transversely to the guide with different angles in each point of the latter. In this manner the carriage is movable along the guide with reduced clearances at any point thereof.

Such steering carriages are, however, very costly and complex as they require careful construction and adjustment, for example, of the steering elements in order to eliminate clearances and ensure the necessary operating precision and stability.

Further, the aforesaid transporting apparatuses are not particularly suitable for use in the pharmaceutical and/or food field because the carriages cannot be easily and rapidly assembled on or disassembled from the guide such as to be suitably and effectively washed and sterilised; further, such transporting apparatuses can give rise to contamination with lubricating substances used for the steering elements.

SUMMARY OF THE INVENTION

An object of the present invention is to improve known transporting apparatuses for packaging machines, in particular by increasing the movement precision and flexibility of use.

Another object is to obtain a transporting apparatus that is able to move the containers precisely and accurately, ensuring an absence of clearances between transporting carriages of the containers and guides at any point of the latter, in particular in the connecting portions between rectilinear parts and curved parts of the aforesaid guides. A further object is to obtain a transporting apparatus that enables the transporting carriages of the containers to be assembled and disassembled rapidly, simply and precisely. Another object is to carry out a transporting apparatus that is particularly suitable for use in aseptic/sterile environments, for example for packaging pharmaceutical/cosmetic/food products, i.e. which is easily and effectively washable and sterilisable.

BRIEF DESCRIPTION OF THE FIGURES

The invention can be better understood and implemented with reference to the attached drawings, which illustrate an embodiment thereof by way of non-limiting example, in which:

FIG. 12 is a section along line XII-XII in FIG. 9;

FIG. 13 is a section along line XIII-XIII in FIG. 9;

FIG. 18 is a front view of another embodiment of the transporting carriage of the transporting apparatus of the invention;

FIG. 19 is a side view of the carriage in FIG. 18;

FIG. 22 is a section along line XXII-XXII in FIG. 18;

FIG. 23 is a partial section along line XXIII-XXIII in FIG. 18;

FIG. 24 is a partial section along line XXIV-XXIV in FIG. 18;

FIG. 29 is a section along line XXIX-XXIX in FIG. 27;

FIG. 30 is a section along line XXX-XXX in FIG. 28;

DETAILED DESCRIPTION

Figure 1:
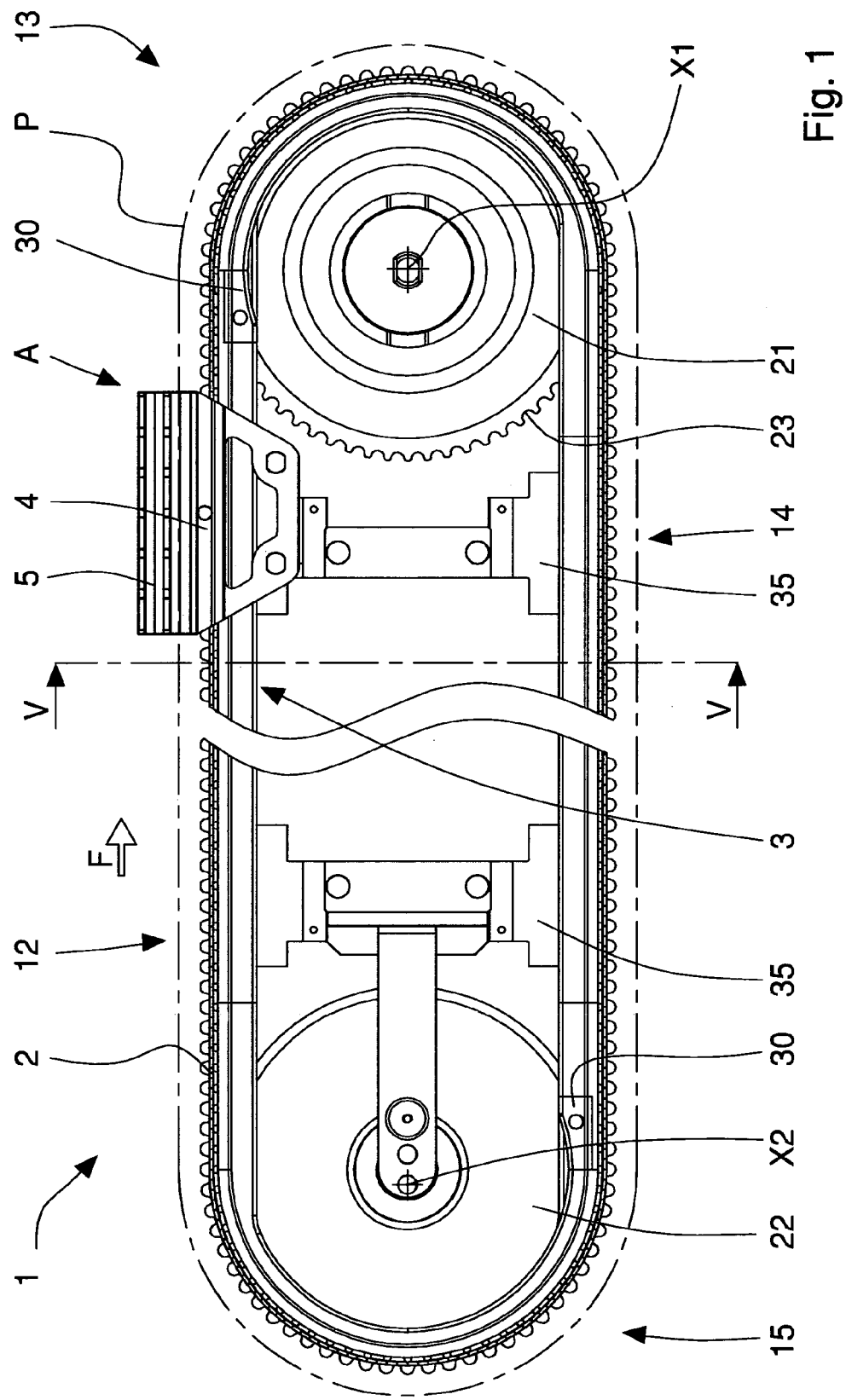
FIG. 1 is a interrupted front view of the transporting apparatus of the invention.
Figure 2:
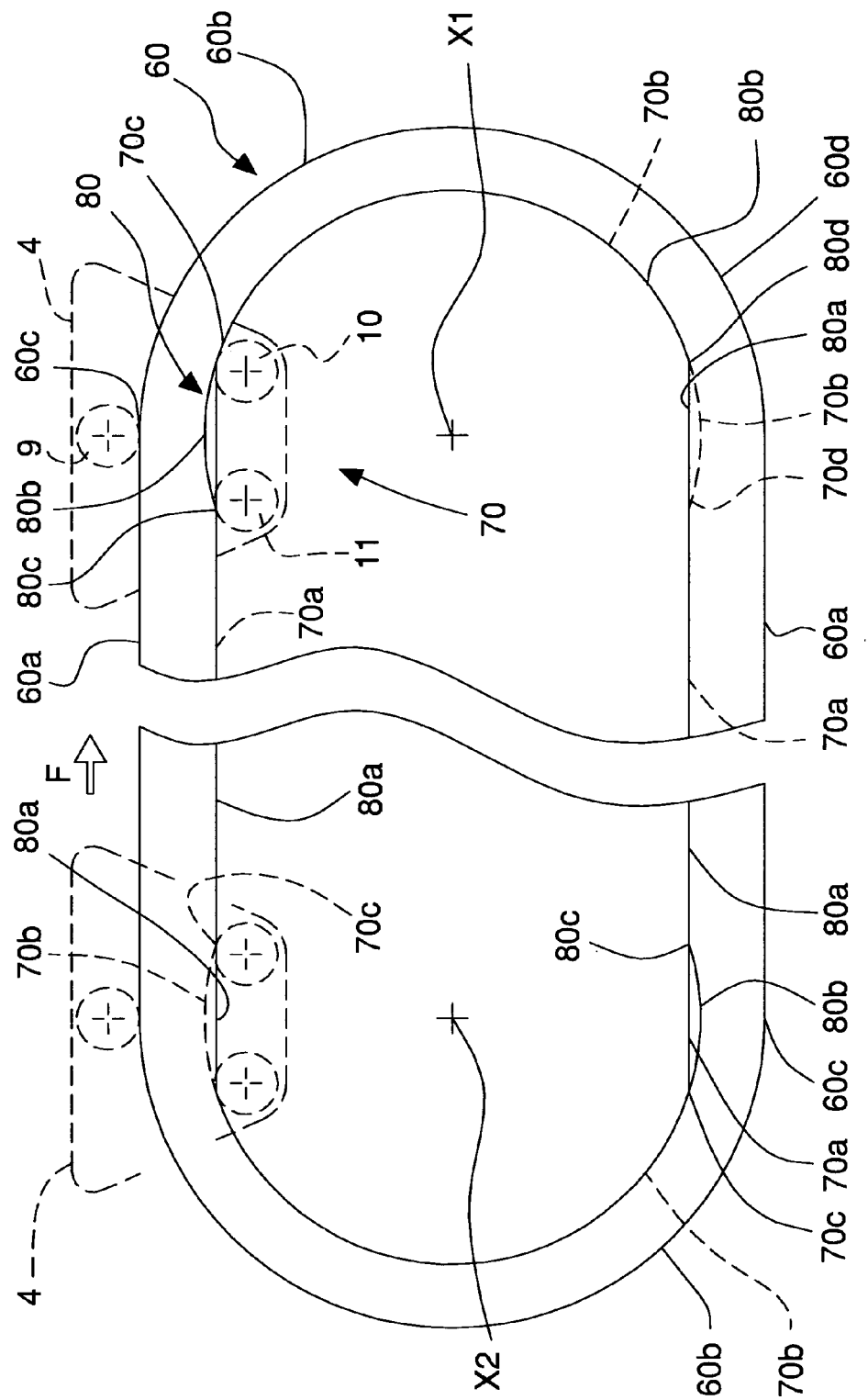
FIG. 2 is a schematic front view of a guide arrangement of the apparatus in FIG. 1.
Figure 3:
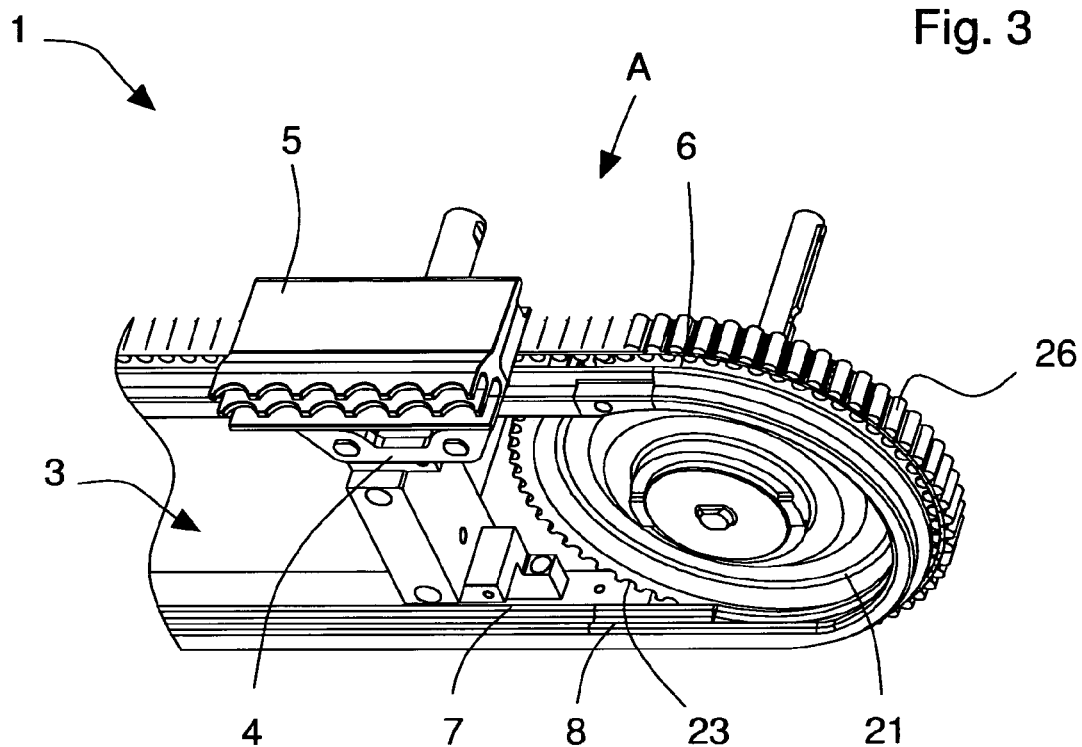
FIGS. 3 and 4 are respectively front and rear prospective partial views of the transporting apparatus in FIG. 1, highlighting a transporting carriage with corresponding support element for containers in one operative configuration.
Figure 4:
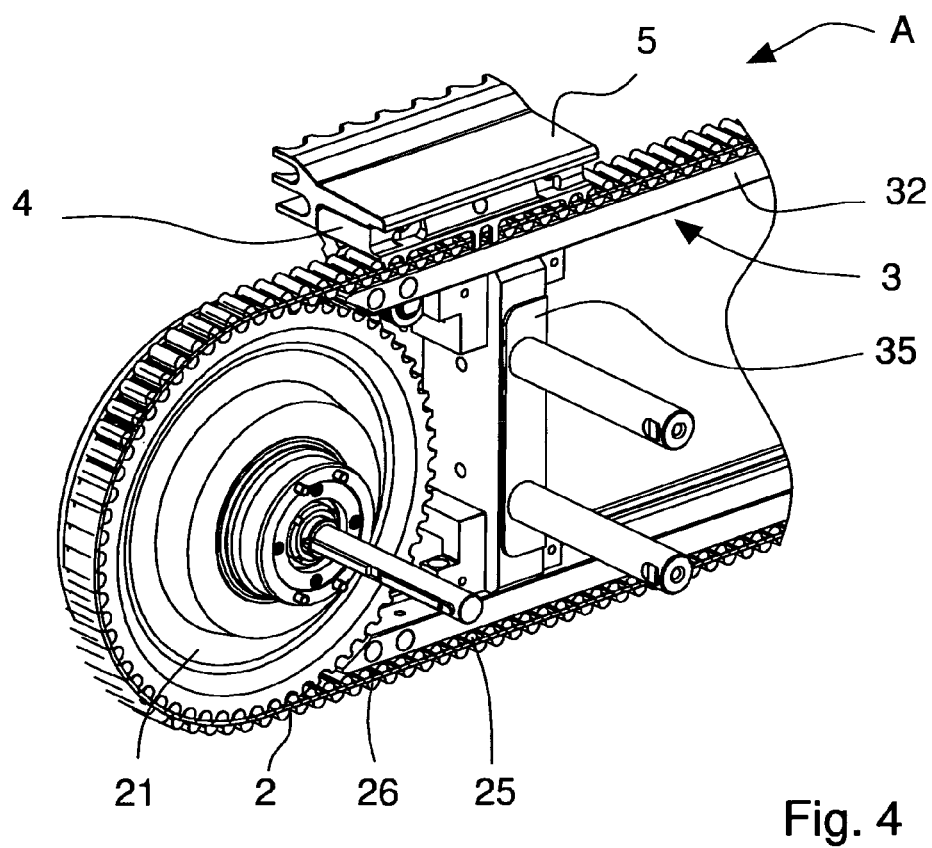

With reference to FIGS. 1 to 5, with 1 there is indicated the transporting apparatus of the invention arranged for transporting containers 100 in an automatic packaging machine for pharmaceutical and/or cosmetic and/or food use, that is of known type and is not illustrated in the figures.

The transporting apparatus 1 includes a movement arrangement 2 that is suitable for moving one or more transporting carriages 4 along a movement path P, for example, in an advance direction F, with each carriage 4 having a respective support element 5, a so-called "godet", being removably coupled. The carriage is arranged for housing one or more containers 100 to be packaged. If the transporting apparatus includes a plurality of carriages 4 (this configuration is not shown) the latter will be regularly spaced apart from one another by a set step.

The movement arrangement 2 includes, for example, a belt or strap or other elongated flexible element wound in a closed loop around, and moved by, pulley elements 21, 22. The latter includes, for example, a driving pulley 21 and idle pulley 22 which are both rotatable around respective parallel rotation axes X1, X2. The idle pulley 22 is located upstream of the driving pulley 21 with respect to the advance direction F.

In a non-illustrated version of the apparatus, the pulley elements can include three or more pulleys defining for the belt 2 a circuit closed in a loop with several lobes.

The belt 2 includes a dragging arrangement 26 arranged for coupling with a hooking arrangement 45, 46 (which are visible in FIG. 8) of each carriage 4 in an operative configuration A and a further dragging arrangement 25 arranged for engaging with a gripping arrangement 23, made at least in the driving pulley 21. In particular, the belt 2 is of the double-toothing type, the external and the internal toothing making, respectively, the dragging arrangement 26 and the further dragging arrangement 25.

The meshing between the further dragging arrangement 25 and the gripping arrangement 23 makes the dragging of the belt 2 follow rotation of the driving pulley 21 and ensures the phase relationship between the pulley elements 21, 22 and the belt 2, preventing slipping and sliding in relation to the latter.

In a version of the transporting apparatus 1 that is not illustrated in the figures, the movement arrangement includes a strap or a chain moved by pulleys or wheels and provided with a dragging arrangement including articulated arms, or similar mechanisms connected to the carriages 4.

The transporting apparatus 1 further includes a guide arrangement 3 that slidingly supports and guides along the movement path P the carriages 4 that are provided with respective rolling elements 9, 10, 11, in particular wheels. The guide arrangement 3 further supports the belt 2 in the portions of the latter that are not wound around the pulleys 21, 22.

The guide arrangement 3 also extends in such a manner as to form a closed loop that places itself side by side the transporting belt 2.

The guide arrangement 3 is fixed to, and supported by, a frame 35 of the transporting apparatus 1 intended for being in turn fixed to a support structure 36 of the packaging machine.

The guide arrangement 3 includes a guide body 31 connected to and supported by the frame 35 and to which are fixed three distinct and parallel guides, in particular a first guide 6, a second guide 7 and a third guide 8 arranged for supporting and guiding, in the operative configuration A of the carriage 4, respectively a first rolling element 9, a second rolling element 10 and a third rolling element 11 of the aforementioned carriage 4. The rolling elements 9, 10, 11 include, with reference to the embodiment illustrated in FIGS. 1 to 5, respective wheels mounted on the carriage 4 that are free to rotate around respective rotation axes that are parallel to one another and in particular parallel to the rotation axes X1, X2 of the pulleys 21, 22. Advantageously, for pharmaceutical applications in a sterile environment, in order to reduce wear and contamination, the guides 6, 7, 8 can be made of stainless steel or anodised aluminium and wheels 9, 10, 11 can be made of stainless steel covered with polyurethane according to the standards of the United States Food and Drug Administration (FDA approved).

Figure 5:
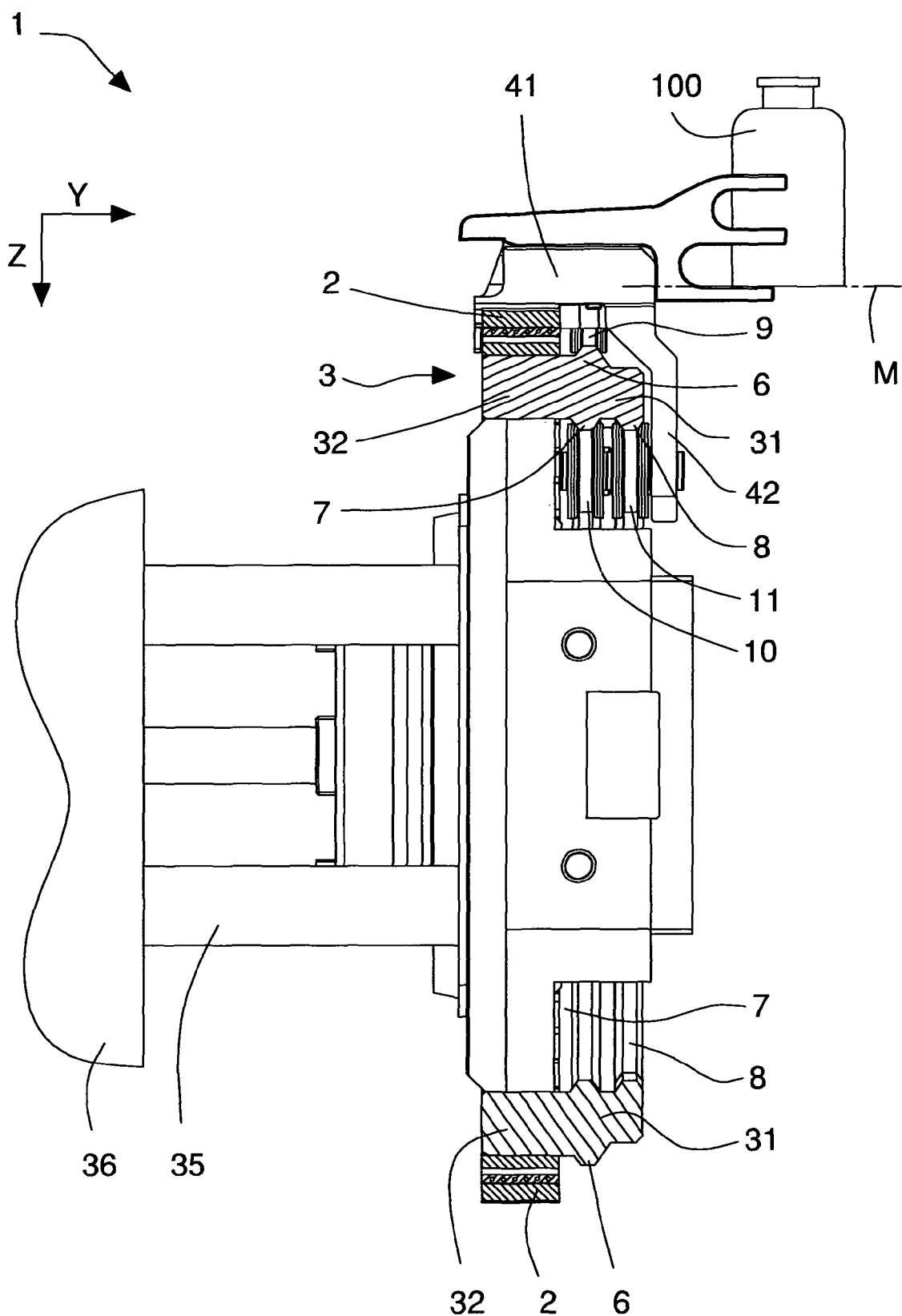
FIG. 5 is a section along line V-V in FIG. 1.
Figure 6:
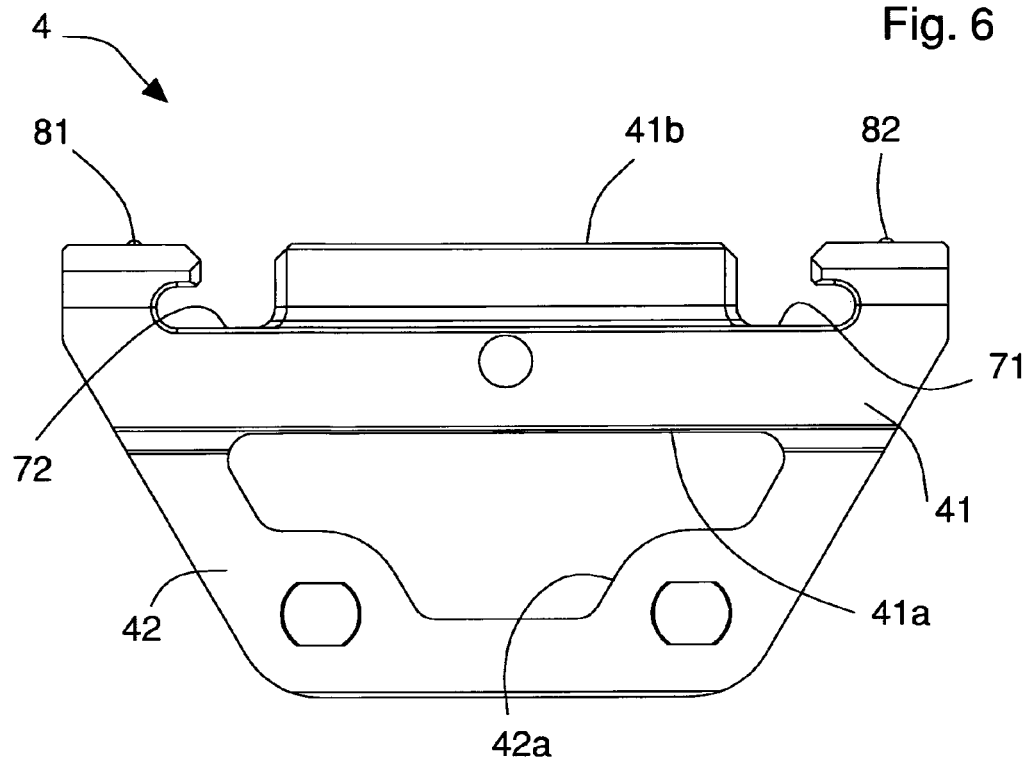
FIG. 6 is a front view of the transporting carriage of the apparatus in FIG. 1.
Figure 7:
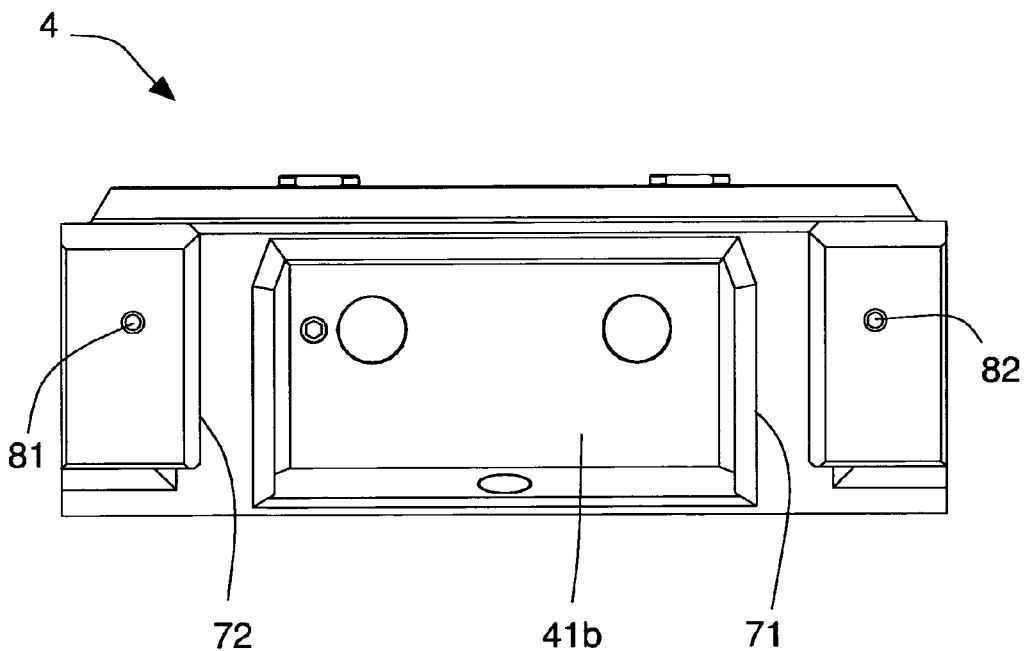
FIG. 7 is a top plan view of the carriage in FIG. 6.

In the embodiment illustrated in FIG. 5 and with reference to a transversal plane, in particular orthogonal to the guides 6, 7, 8 and parallel to the rotation axes of the pulleys X1, X2, the first guide 6 is opposite the second guide 7 (and in particular also coplanar with the latter) and the third guide 8, i.e., the first guide 6 is arranged on an opposite side of the guide body 31 with respect to the second guide 7 and to the third guide 8. The latter are arranged substantially side by side and adjacent. In this manner, in the operative configuration A the carriage 4 is connected to the guide arrangement 3 and can no longer be disconnected therefrom.

In a variant of the apparatus that is not illustrated, the third guide 8 may not be side by side and adjacent to the second guide 7, in other words staggered along the plane that is transversal to the guides 6, 7, 8.

In a further variant of the transporting apparatus that is not illustrated, the three guides 6, 7, 8 are arranged (with reference to the transversal plane) spaced angularly apart by 120°.

The guide arrangement 3 further includes a further guide body 32 fixed to the guide body 31 and arranged for slidingly supporting the belt 2. The guide body 31 and the further guide body 32 can be integrated into a single body.

The guides 6, 7, 8 define respective movement profiles 60, 70, 80 for the aforesaid wheels 9, 10, 11 the aforesaid profiles being conjugated together and shaped such as to maintain each wheel 9, 10, 11 in contact with the respective guides 6, 7, 8, with substantially null or very reduced clearances, in each point of the latter along the movement path P, as explained in greater detail further on in the description. In other words, the guides 6, 7, 8 form tracks or rails along which the wheels of the carriage can roll with reduced friction as rolling friction, as is known, is much more reduced than sliding friction.

In the embodiment illustrated in FIGS. 1 to 5, the guides 6, 7, 8 are made directly on the guide body 31 and comprise longitudinal relieves having a shaped, for example trapezium-shaped, cross section in such a manner as to engage and lock transversely the wheels 9, 10, 11 of the carriage 4, the wheels being provided with races having a complementary shape.

In this manner, and by virtue of the reciprocal positioning of the guides 6, 7, 8, in the operative configuration A each carriage 4 is movable only along the movement path P and is immobilised in directions that are transversal to the guides 6, 7, 8. In particular, a first direction Y is parallel to the rotation axes of the wheels 9, 10, 11 and to a sliding plane M defined by the upper branch of the belt 2 and on which the containers 100 slide. A second direction Z is orthogonal to the first direction Y and to the aforesaid sliding plane M.

The first wheel 9 of the carriage 4 is substantially opposite the second wheel 10 and the third wheel 11, the latter being spaced apart from one another transversely and longitudinally. In particular the third wheel 11 is located upstream of the second wheel 10 with reference to the advance direction F of the carriage 4. In this manner, in a front view, on a plane parallel to the guides 6, 7, 8, i.e. orthogonal to the rotation axes of the wheels 9, 10, 11, the latter appear to be arranged at the vertices of a triangle, in particular an isosceles triangle. In other words, the rotation axes of the wheels 9, 10, 11 define on said plane parallel to the guides 6, 7, 8 (FIG. 2) the vertices of a triangle. It should be noted that the wheels are not coplanar with said plane, being spaced transversely (at least the second wheel 10 and the third wheel 11), with reference to the transversal plane that is orthogonal to the guides 6, 7, 8 (FIG. 5). This ("triangle") configuration ensures maximum stability of the carriage when it is moved, in particular in the connecting parts of the guides interposed between a rectilinear part and a curved part.

In a version of the transporting apparatus 1 of the invention, that is not illustrated in the figures, the guide arrangement 3 includes four guides, for example arranged as side by side pairs, a first pair of guides being opposite the second pair of guides, i.e., arranged on an opposite part of the guide body 31 with respect to the second pair of guides. The carriage consequently includes four wheels that are suitable for engaging with the respective guides. In a front view, on a plane parallel to the guides, two of the wheels, for example those engaged with the first pair of guides, are placed side by side and spaced apart transversely with the respective rotation axes substantially aligned. The remaining two wheels, engaged in the second pair of guides, are spaced apart from one another transversely and longitudinally. Also in this version, therefore, on the plane parallel to the guides, the four wheels are arranged at the vertices of a triangle, in particular an isosceles triangle, as the pair of wheels with aligned axes behaves substantially as a single wheel. The "triangle" configuration ensures maximum stability of the carriage when it is moved, in particular in the connecting parts of the guides interposed between a rectilinear part and a curved part. The presence of four guides enables the loads and forces acting on guides and wheels to be better distributed if the carriage transports particularly heavy loads.

With reference to the embodiment of the transporting apparatus 1 illustrated by way of example in FIG. 1, the flexible movement arrangement 2 wound in a closed loop around the pulleys 21, 22 includes an upper or transporting branch, and a lower or return branch, connected by curved branches at the pulleys.

Similarly, the guide arrangement 3 includes a first upper rectilinear part 12, a first curved part 13, a second lower rectilinear part 14 and a second curved part 15. The curved parts 13, 15 have a semicircular shape.

The further guide body 32 extends only in the rectilinear parts 12, 14, whilst the guide body 31 extends also in the curved parts 13, 15.

In the first rectilinear part 12 the guide arrangement 3 supports and guides the carriages 4 that transport the containers 100 to be packaged. In the second lower rectilinear part 14 and in the curved parts 13, 15 the guide arrangement supports the carriages 4, the support elements 5 of which are devoid of containers 100.

At rectilinear parts 12, 14 of the guide arrangement 3 the movement profiles 60, 70, 80 of the guides 6, 7, 8 include respective rectilinear portions 60a, 70a, 80a. At the curved parts 13, 15 the movement profiles 60, 70, 80 of the guides 6, 7, 8 include respective curved portions 60b, 70b, 80b, having for example respective constant bending radii.

The rectilinear portions 60a, 70a, 80a and the curved portions 60b, 70b, 80b of the movement profiles 60, 70, 80 are arranged in succession along the movement path P in such a manner that the wheels 9, 10, 11 of the carriage 4 move from the respective rectilinear portions 60a, 70a, 80a to the subsequent curved portions 60b, 70b, 80b, and vice versa, substantially at the same time. In this manner, the wheels 9, 10, 11 of the carriage 4, whilst maintaining a constant and correct contact with the respective guides 6, 7, 8, with virtually null clearance, enable the carriage 4 to pass from a rectilinear part to the subsequent curved part and vice versa without the need for steering wheels. Between the rectilinear portions 60a, 70a, 80a of the first rectilinear part 12 (or of the second lower rectilinear part 14) and the curved portions 60b, 70b, 80b of the first curved part 13 (or of the second curved part 15) there are provided joining portions 60c, 70c, 80c.

Similarly, between the curved portions 60b, 70b, 80b of the first curved part 13 (or of the second curved part 15) and the rectilinear portions 60a, 70a, 80a of the second rectilinear part 14 (or of the first rectilinear part 12) further joining portions 60d, 70d, 80d are provided.

The aforesaid joining portions 60c, 70c, 80c, 60d, 70d, 80d are shaped in such a manner as to enable a uniform and regular passage of the wheels 9, 10, 11 between the rectilinear portions and the curved portions and vice versa, so as to have a continuous and constant contact between wheels and guides that are free from impacts and vibrations. The joining portions are for example portions of a curve with a constant radius or cycloid curves, polynomial curves, etc. that are calculable with normal and known calculating tools and are such as to enable continuous rolling without jumps and shocks of the wheels of the carriage.

In an alternative embodiment that is not illustrated, the guide arrangement can include curved parts the movement profiles of which include respective curved portions with different bending radii, which are connected by suitable joining portions. In substance, the guide arrangement can define a varied movement path P.

It is opportune to note that the transporting apparatus 1 of the invention enables the containers 100 to be moved in a precise and accurate manner, ensuring reduced and negligible clearances between the carriages 4 and the guides 6, 7, 8 at any point of the latter, also in the joining portions between rectilinear parts and curved parts of the aforesaid guides and even using one carriage 4 having wheels with a fixed, i.e. non-steering axis. Such carriage 4, which is illustrated better further on in the description, is thus simpler, more robust and cheaper than the carriages with steering wheels that are normally used for these applications.

The transporting apparatus according to the invention further enables wear of the guides to be reduced further, inasmuch as each guide supports only one wheel.

FIGS. 6 to 13 illustrate in detail the transporting carriage 4 that includes a main body 41 provided on a lower side 41a with the hooking arrangement 45, 46 (arranged for coupling in the operative configuration A with the dragging arrangement 26 of the belt 2) and on an upper side 41b with a coupling arrangement 71, 72 for removable connection with the respective support element 5 of the containers 100.

From the main body 41a support body 42 extends laterally and below to which the second wheel 10 and the third wheel 11 are fixed in a freely rotatable manner. The support body 42 comprises a plate with an approximately trapezium shape and which is provided with a shaped and through central opening 42a to reduce the total weight of the carriage 4. The second wheel 10 and the third wheel 11 are fixed to the support body 42 respectively by a connecting shaft 28 and a further connecting shaft 29 having different lengths to enable the aforesaid wheels to engage on the second guide 7 and the third guide 8 placed side by side. The second wheel and the third wheel 11 are mounted on the respective connecting shafts 28, 29 by pairs of rolling bearings 91.

The first wheel 9 is mounted on the carriage 4 by an adjusting device 50 that supports the first wheel 9 and enables the position thereof along the first direction Y and the second direction Z to be adjusted with precision.

Figures 10, 11:
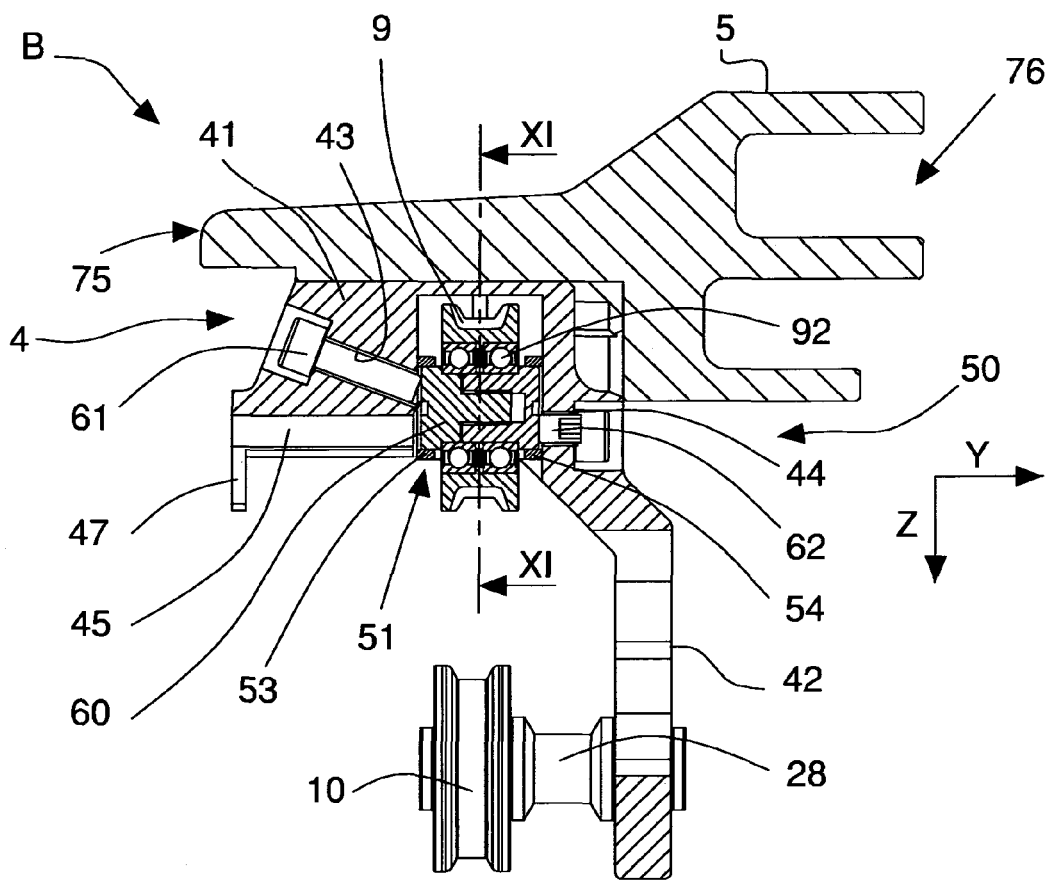
FIG. 10 is a section along line X-X in FIG. 9.
FIG. 11 is a section along line XI-XI in FIG. 10.

As illustrated in detail in FIGS. 10 and 11, the adjusting device 50 includes an adjusting element 51 that is partially housed in a lower seat 48 provided on the lower side 41a of the main body 41.

The adjusting element 51 is provided with a first through cavity 52 that is suitable for containing the first wheel 9 and defining on said adjusting element 52 two facing and opposite walls 53, 54. On said walls 53, 54 two respective through circular openings are made that are substantially coaxial—with an axis parallel to the first direction Y—that are suitable for receiving a support pivot 60 on which is rotatably mounted, for example by interposing a pair of respective rolling bearings 92, the first wheel 9.

The support pivot 60 is for example made, for assembly needs, in two parts that are coupled with one another by means of a threaded connection.

The transversal position of the first wheel 9 along the first direction Y can be adjusted by modifying the position of the support pivot 60 with respect to the adjusting element 51, by means of a first fixing arrangement 61, 62 associated with the main body 41 and acting on opposite ends of the aforementioned support pivot 60.

The first fixing arrangement includes, in particular, a first screw 61 and a first threaded grub screw 62 that engage in respective threaded holes 43, 44 of the main body 41.

The transversal position of the first wheel 9 along the second direction Z can be adjusted by modifying the position of the adjusting element 51, which is connected in an adjustable manner to the main body 41, by a second fixing arrangement 63, 64.

For this purpose, on an internal face 55 of the adjusting element 51 located inside the seat 48 of the main body 41 and at an end of such adjusting element 51 there is provided a transversal relief 56 that abuts on a bottom wall 48a of said seat 48. The transversal relief 56 acts as a fulcrum around which the adjusting element 51 can rotate with respect to the main body 41. The size of the rotation is defined by acting on an adjustable abutment 65, comprising for example a screw or threaded grub screw screwed on the main body 41. The adjustable abutment 65 protrudes from the main body 41 with an end portion that acts on the internal face 55, at the end of the adjusting element 51 opposite the end near the transversal relief 56. The length of the aforesaid end portion of the adjustable abutment 65 can be calibrated by screwing or unscrewing the latter appropriately.

The second fixing arrangement 63, 64 includes a pair of screws inserted into respective through holes of the main body 41 and engaged in threaded holes made on the internal face 55, at opposite sides of the adjusting element 51. By tightening the second fixing arrangement 63, 64 it is thus possible to lock the adjusting element 51 in the angular position defined by the cooperation between the transversal relief 56 and the adjustable abutment 65, in particular by the length of the end portion of the adjustable abutment 65 that protrudes from the main body 41.

It should be noted that following rotation of the adjusting element 51 around the transversal relief 56 the rotation axis of the first wheel 9 moves along an arched adjusting trajectory. Owing to the very reduced size of this rotation, the movement of this axis can be considered to be nevertheless substantially linear and parallel to the second direction Z.

Owing to the adjusting device 50 it is thus possible to adjust precisely, rapidly and simply the position of the wheel 9 in the first direction Y and in the second direction Z transversely to the guides, and in this manner eliminate, or significantly reduce, any construction and/or assembly clearance between wheels and guides, or even preload in an opportune manner the wheels on the guides, in particular along the second direction Z.

Figure 8:
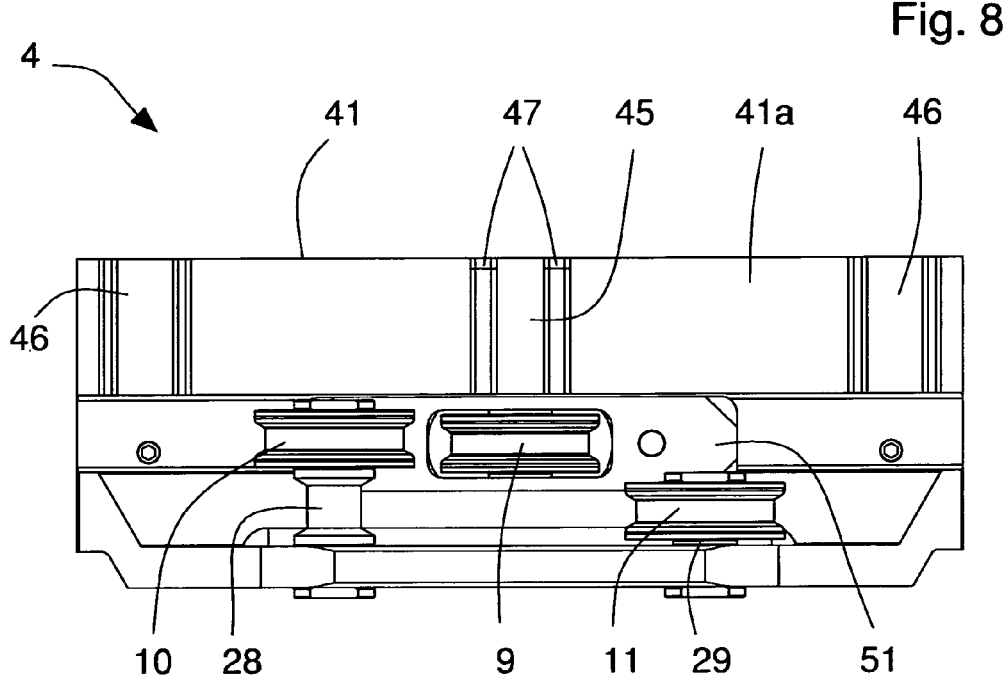
FIG. 8 is a bottom plan view of the carriage in FIG. 6.
Figure 9:
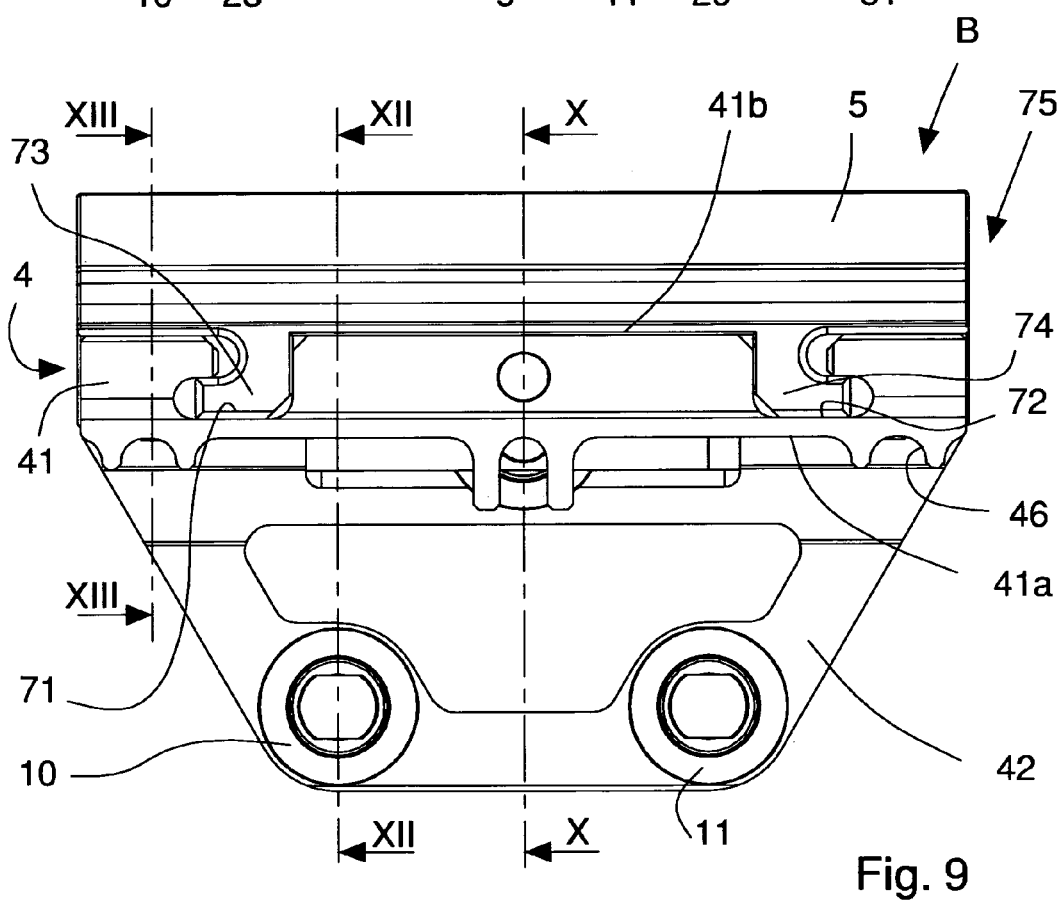
FIG. 9 is a rear view of the carriage in FIG. 6 associated with the support element for containers.

As illustrated in detail in FIGS. 8 and 9, the hooking arrangement 45, 46 is made on a lower side 41a of the main body 41 and includes toothed portions arranged for engaging with the external toothing 26 of the belt 2. In particular, the hooking arrangement includes a first toothed portion 45 arranged centrally at the first wheel 9, and two second toothed portions 46 arranged at opposite ends of the carriage 4.

In use, when the carriage is moved by the belt 2, whilst the central toothed part 45 always remains engaged with the belt 2, the peripheral toothed portions 46 engage/disengage from the belt 2 when the carriage 4 moves from the rectilinear parts to the curved parts of the belt 2 and vice versa.

A side containing arrangement 47 is provided on the carriage 4 at the central toothed part 45 to prevent, in cooperation with the support body 42, relative movements between the belt 2 and carriage 4 in the first direction Y.

The side containing arrangement 47 includes in particular a pair of appendages fixed to the lower side 41a of the main body 41 so as to abut in the operative configuration A of the carriage 4 on a flank of the belt 2.

The coupling arrangement includes, for example, a pair of transversal grooves 71, 72 made on the upper side 41b of the main body 41 of the carriage 4 and intended for receiving a further coupling arrangement 73, 74 of the support element 5. The coupling arrangement 73, 74 includes in particular a pair of pads fixed to a bottom wall of the support element 5.

The transversal grooves 71, 72, which have a cross section for example "L"-shaped, are substantially parallel to the rotation axes of the wheels 9, 10, 11 and thus orthogonal, in the operative configuration A, to the guides 6, 7, 8.

The support element 5 includes a connecting portion 75 arranged for interfacing with the carriage 4 and includes the coupling device 73, 74 and a support portion 76 configured for housing one or more containers 100.

A locking arrangement 81, 82 is provided on the upper side 41b of the main body 41 to stop in an assembly position B (FIGS. 11 and 13) the support element 5 on the carriage 4.

The locking arrangement 81, 82 includes, for example, one or two stop pivots, for example two, which are slidingly and resiliently housed in respective seats made in the main body 41 and provided with abutting portions that are suitable for engaging in cavities of the support element 5, when the latter is in the assembly position B. The stop pivots 81, 82 are movable inside the respective seats, and can resiliently enter inside the latter to enable the support element 5 to be inserted or removed.

Owing to the coupling arrangement 71, 72, and the further coupling arrangement 73, 74 and to the locking arrangement 81, 82 it is thus possible to assemble/disassemble the support element 5 on/from the carriage 4 rapidly, simply and precisely, for example in the case of a change in the size of the containers to be packaged, or in the case of washing/sterilisation procedures of the apparatus and/or packaging machine. The coupling arrangement 71, 72, 73, 74 in particular ensures correct positioning of the support element 5, and thus of the containers 100, along the movement path P in the advance direction F. The locking arrangement 81, 82 ensures correct positioning of the support element 5 along the first direction Y.

The guide arrangement 3 is provided with one or more assembly portions 30 (which are visible in FIG. 1), for example two, each of which is removable for disengaging one of the wheels of the carriage 4 from the respective guide, in a defined removal position R along the movement path P. By disengaging a wheel from the guide it is thus possible to separate and detach the carriage 4 from the guide arrangement 3 and from the belt 2.

Each assembly portion 30 comprises, for example, a portion of the guide body 31 with which a part of the corresponding third guide 8 is associated, the assembly portion 30 comprising at least the joining portion 80c of the movement profile 80 of the third guide 8.

The assembly portions 30 are removably fixed to the guide body 31, for example by threaded elements.

Figure 14:
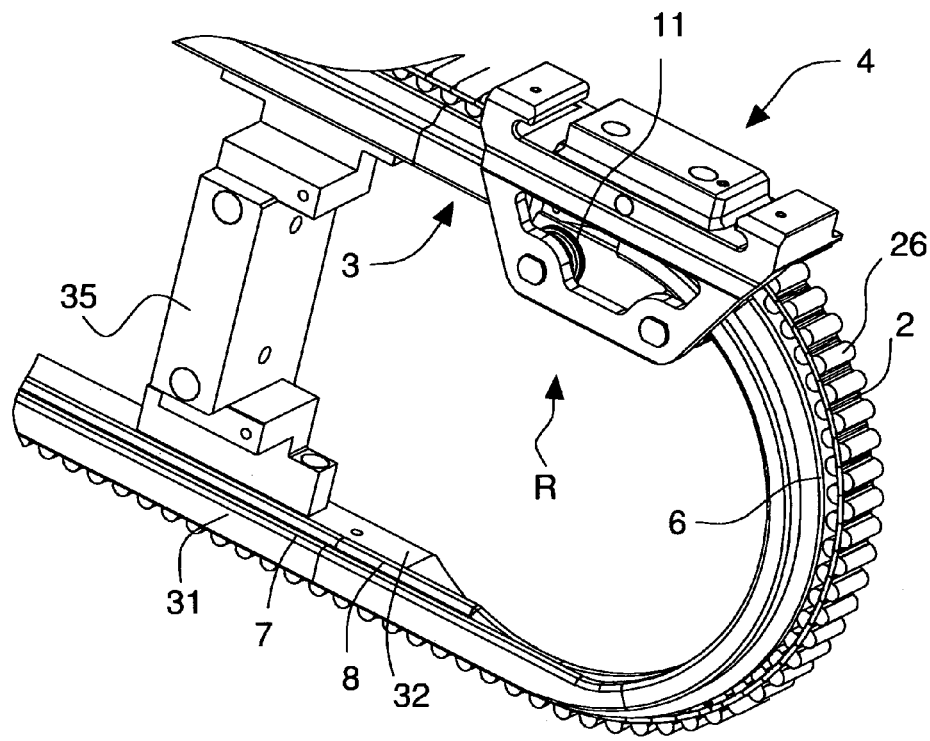
FIGS. 14 and 15 are respectively front and rear prospective partial views of the transporting apparatus in FIG. 1 in a disassembly step of the carriage.
Figure 15:
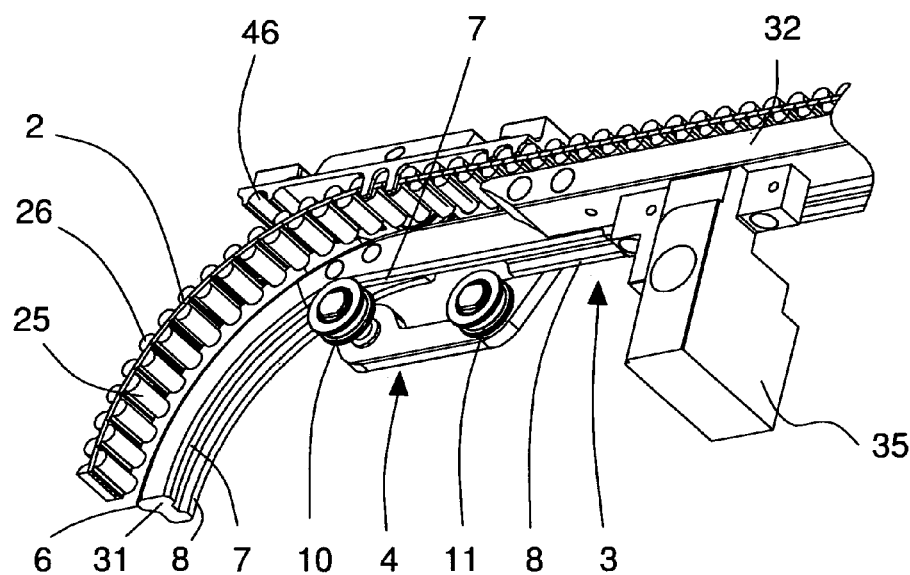
Figure 16:
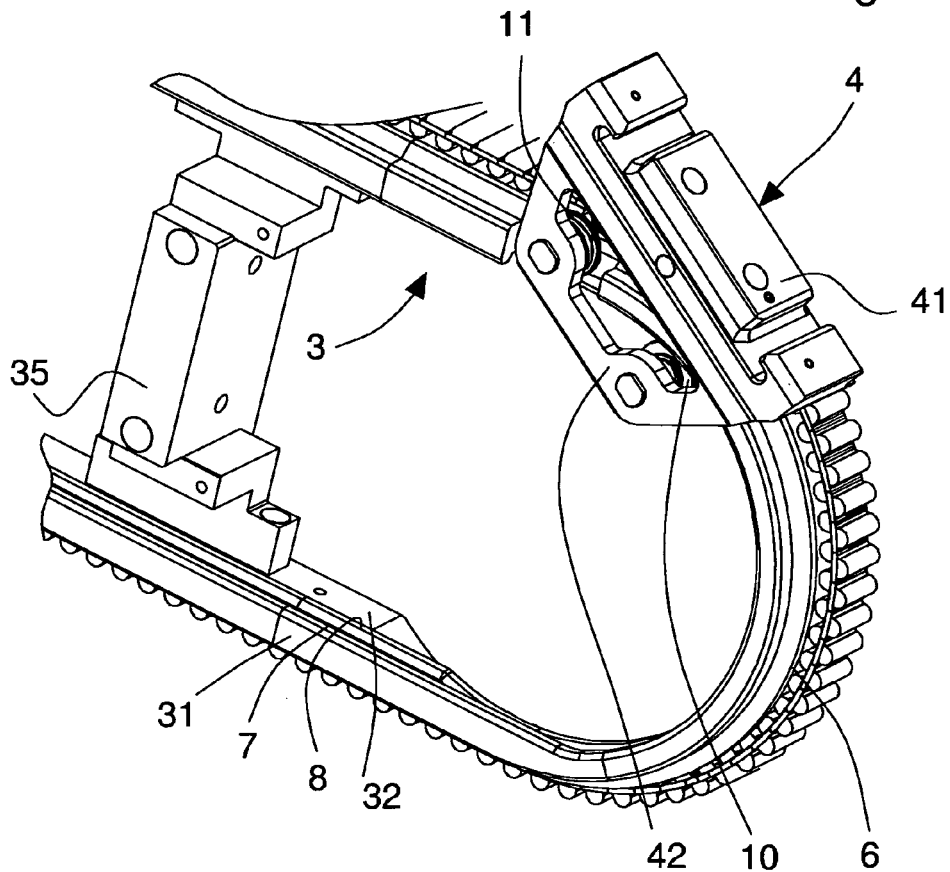
FIGS. 16 and 17 are respectively front and rear prospective partial views of the transporting apparatus in FIG. 1 in a subsequent disassembly step of the carriage.
Figure 17:
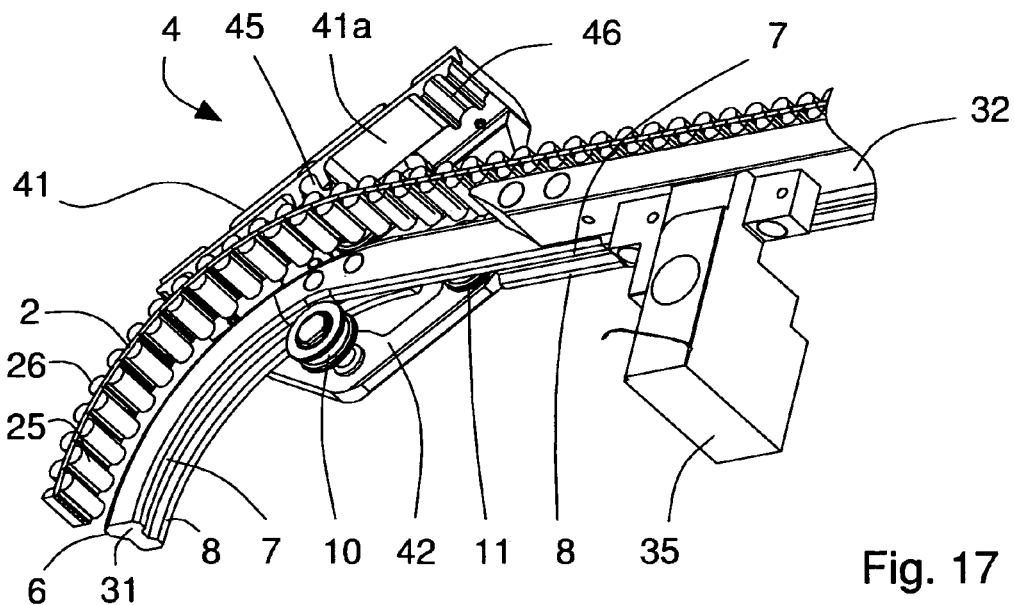
Figure 20:
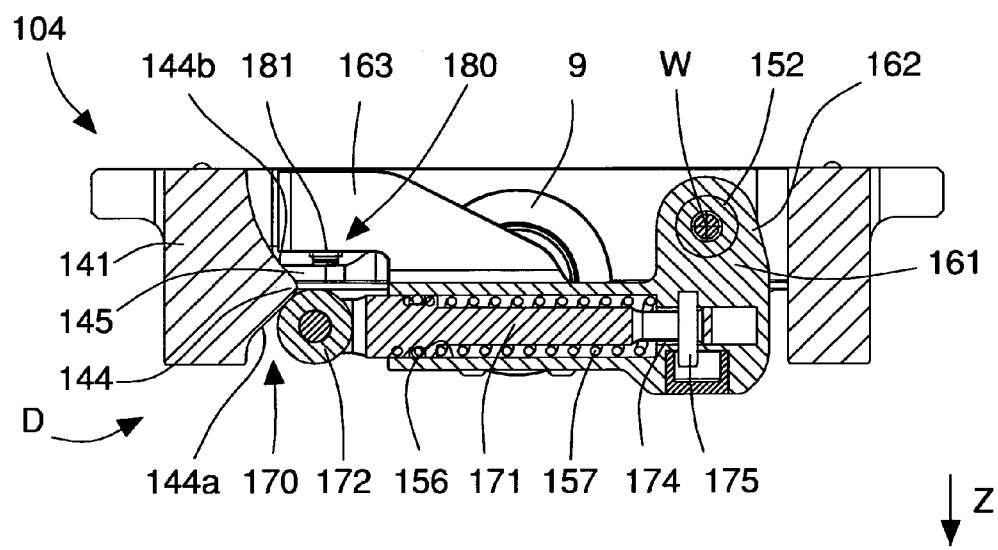
FIG. 20 is a section along line XX-XX in FIG. 19.
Figure 21:
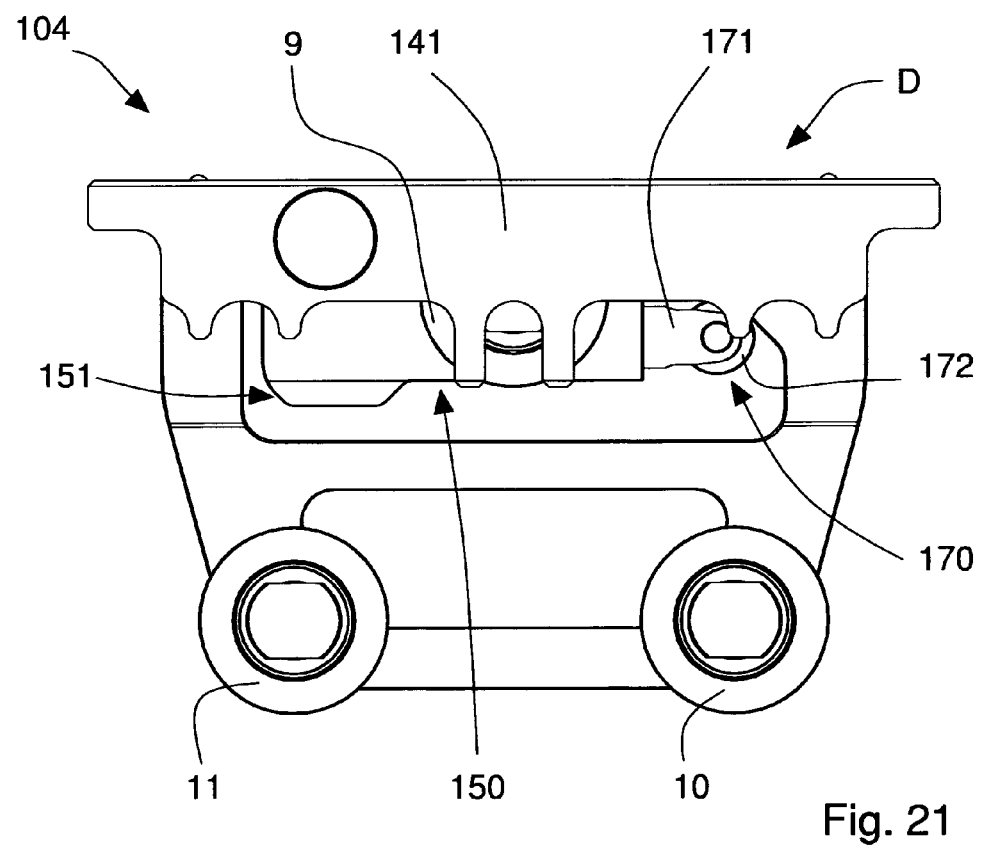
FIG. 21 is a rear view of the carriage in FIG. 18.
Figure 25:
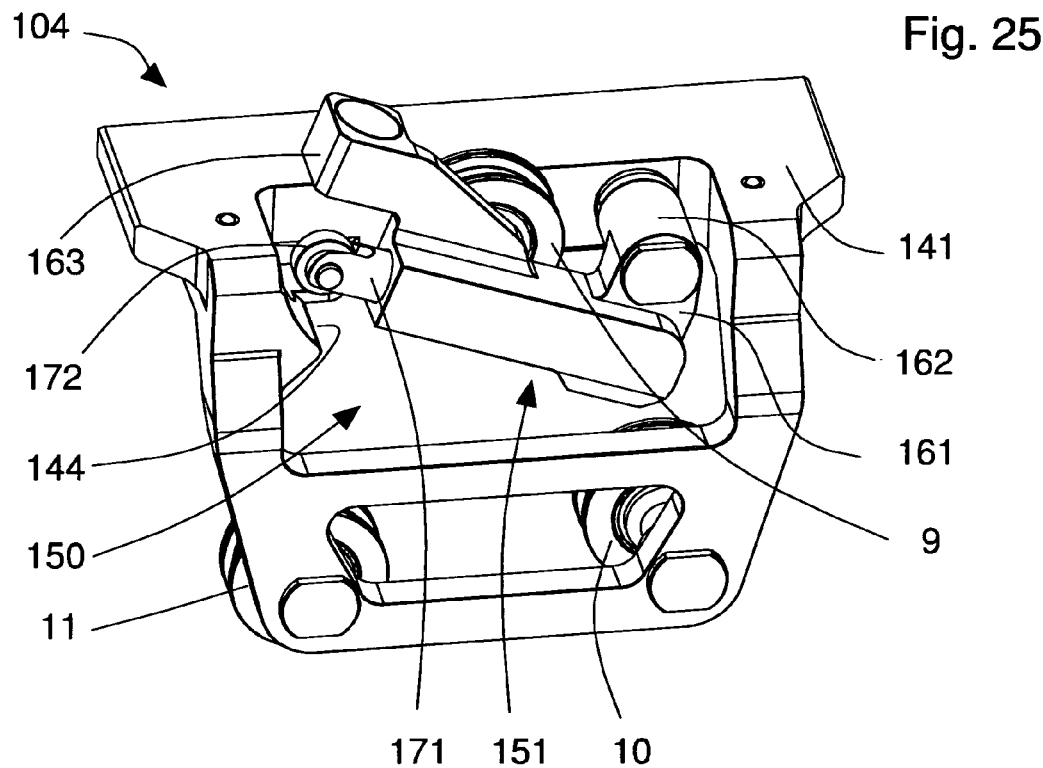
FIGS. 25 and 26 are perspective views of the carriage in FIG. 18 in two subsequent disassembly configurations.

As illustrated in FIGS. 14 and 17 that show two subsequent steps of removing the carriage 4 from the guide arrangement 3, once the assembly portion 30 is detached from the guide arrangement 3 (step 1), in the removing position R the third wheel 11 is disengaged (FIGS. 14 and 15). In this manner, the carriage 4 can be rotated and lifted up in such a manner as to detach from the respective guides 6, 7 the first wheel 9 and the second wheel 10. At the same time it is possible to detach the hooking arrangement 45, 46 from the external toothing 26 of the belt 2 (step 2). At this point, by moving the carriage 4 along the first direction Y it is possible to remove the carriage 4 from the guide arrangement 3 and from the belt 2 (step 3 not shown).

The assembly procedure comprises the same above steps, but conducted in reverse order.

The transporting apparatus 1 of the invention thus enables the carriages 4 to be inserted on and removed from the guides 6, 7, 8 very rapidly and simply so as to enable operations of routine or special maintenance or washing and/or sterilisation procedures to be conducted on the carriages and/or the entire apparatus. It is opportune to note that the carriages 4 can be inserted/removed without having to be disassembled even partially without having, for example, to remove one or more wheels from the support body 42.

The structure of the guide arrangement 3, which includes the guide body 31, on which the guides 6, 7, 8 are made in the form of longitudinal relieves with a shaped cross section, and the further guide body 32, integrated with the guide body 31, is particularly simple, in particular suitable for washing and sterilisation operations, as it is characterised by easily cleanable surfaces that are devoid of recesses or cavities.

FIGS. 18 to 26 illustrate another embodiment of the transporting carriage 104 that differs from the previously disclosed one through the different structure of the adjusting device 150, which, in addition to supporting the first wheel 9 and enabling the position thereof along the first direction Y and the second direction Z to be adjusted, enables the carriage 104 to be assembled or disassembled in any point of the guide arrangement 3, without the need for the guide arrangement to be provided with assembly portions.

The adjusting device 150 includes a support arm 151 that is rotatably connected to the main body 141 of the carriage 104, in such a manner as to rotate around a respective rotation axis W that is substantially parallel to the rotation axes of the wheels 9, 10, 11.

The support arm 151 with an elongated shape and an almost quadrangular section has at a central portion thereof a respective support pivot 160 on which the first wheel 9 (FIG. 22) is rotatably mounted by the interposition of a pair of respective rolling bearings 93.

An end portion of the support arm 150 is fixed to the main body 141 in such a manner that the position can be adjusted along the rotation axis W, parallel to the first direction Y, in the operative configuration A of the carriage 104 (FIG. 23).

For this purpose, the support arm 151 is mounted rotatably on an adjusting pivot 152, the latter being adjustably connected to the main body 141. In particular, the end portion of the support arm 151 includes a side appendage 161 that supports a sleeve 162 arranged for rotatably housing the adjusting pivot 152. The latter can slide inside a housing 143 obtained in the main body 141 and be locked there in a desired position by a third fixing arrangement 155, 156. The latter includes, for example, a respective first screw, or threaded grub screw, 155 screwed on the main body 141 and acting as an adjustable abutment for the adjusting pivot 152 inside the housing 143. A second screw 156 of the third fixing arrangement is engaged on the main body 141 and screwed on the adjusting pivot 152 in such a manner as to maintain the latter locked against the first screw 155 in the preset position.

By modifying the position of the first screw 155 inside the housing 143 it is thus possible to adjust the position of the adjusting pivot 152 and, thus, of the support arm 151 along the first direction Y.

The support arm 151 can be locked in a desired locking position D around the respective rotation axis W, by means of the resilient abutting arrangement 170 and an adjustable abutting arrangement 180. The latter also enables a desired locking position D to be defined and adjusted.

The resilient abutting arrangement 170 includes a stem 171 inserted partially and slidingly inside a longitudinal cavity 156 of the support arm 151 and provided at a free end, protruding from the longitudinal cavity 156, with a small wheel 172 that is suitable for abutting, at least in the locking position D, on a shaped locking portion 144 made on the main body 141 of the carriage 104.

A resilient member 157, includes, for example, a coil spring, which is inserted inside the longitudinal cavity 156 and acts in such a manner as to push the stem 171 outwards. The maximum stroke of the stem 171 inside the longitudinal cavity 156 is defined by the length of a through slot 174 made on the end of the stem 171 opposite the small wheel 172, the through slot 174 engaging with a transversal pin 175 fixed to the support arm 151.

The shaped locking portion 144 forms, on a section plane that is orthogonal to the rotation axis W of the support arm 151, a tip, or vertex, facing the stem 171, formed of a tilted and opposite first surface 144a and second surface 144b.

The adjustable abutting arrangement 180 (which is visible in detail in FIG. 24) includes an abutting pivot 181 connected in an adjustable manner to a further side appendage 163 of the support arm 151 and a stroke end element 182, fixed to the main body 141 of the carriage 104 and arranged for abutting on the abutting pivot 181 in the locking position D.

The stroke end element 182 comprises an insert, for example cylindrical, made of a material with great mechanical resistance and resistance to wear, fixed to a substantially flat shelf 145 of the main body 141 of the carriage.

In the locking position D the support arm 151 and the first wheel 9 supported thereby are stably locked in a preset position with respect to the second axis Z by virtue of the interaction of the resilient abutting arrangement 170 and of the adjustable abutting arrangement 180. In particular, the abutting pivot 181 is maintained abutting on the stroke end element 182—thus determining the desired position of the support arm 151—by the force exerted by the stem 171 pushed by the resilient member 157 against the first surface 144a. The latter is in fact tilted in such a manner as to promote a suitable rotation of the aforementioned support arm 151, for example, in an anticlockwise direction with reference to FIGS. 18 and 20.

In the locking position D of the support arm 151, when the carriage 104 is mounted on the guide arrangement 3, the first wheel 9 is engaged on the first guide 6. The position of the first wheel 9 along the second axis Z and with respect to the second wheel 10 and the third wheel 11 is such as to ensure the correct contact of all the wheels with the respective guides with reduced clearances or with a preset clamping (preloading) force, that can thus be adjusted by adjusting the abutting pivot 181. In other words, the abutting pivot 181 contributes to discharging part of the force exerted by the stem 171, which therefore does not completely burden on the wheel 9 and the respective guide 6.

By rotating the support arm 151 in such a manner as to roll the small wheel 172 on the first surface 144a, thus overcoming the force exerted by the stem 171, and then on the second surface 144b (anticlockwise with reference to FIGS. 18 and 20) it is possible to move the abutting pivot 181 away from the stroke end element 182 and disengage the first wheel 9 from the first guide 6.

In a first step when the small wheel 172 abuts on the first surface 144a the resilient member 157 opposes this rotation (as the resilient member 157 tends to maintain the support arm in the locking position D); in a second step when the small wheel 172 abuts on the second surface 144b the resilient member 157 promotes this rotation by virtue of the tilt of the second surface 144b.

Figure 26:
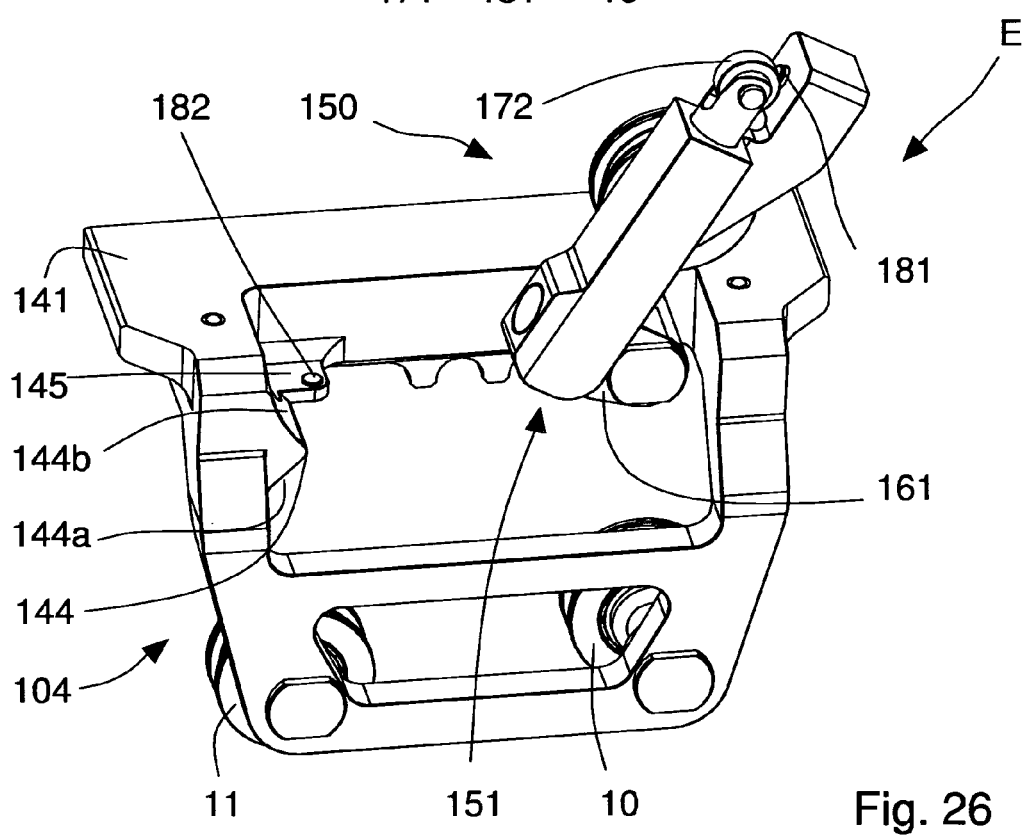

The support arm 151 can then be rotated completely upwards, in a disassembly position E in which the first wheel 9 is rested on the main body 141 and spaced apart from the first guide 6 (see FIG. 26).

It is opportune to note that in the disassembly position E, the carriage 104 can be easily and rapidly removed from the guide arrangement 3 in any point thereof along the movement path P. The guide arrangement 3 is in this case devoid of a removable disassembly portion.

FIGS. 27 to 30 illustrate a variant of transporting carriage 204 that differs from the embodiment specified above through a different structure of the adjusting device 250 and in particular of the support arm 251 and of the abutting arrangement 270, 280.

The support arm 251 is rotatably connected to a main body 241 of the carriage 204 in a manner that is substantially similar to the support arm 151 of the carriage 104 illustrated previously.

An end portion of the support arm 251 is in fact fixed to the main body 241, in such a manner as to be able to be adjusted in position parallel to the respective rotation axis W', i.e. in the operative configuration A of the carriage 204, along the first direction Y.

The support arm 251 is rotatably mounted on an adjusting pivot 252 adjustably connected to the main body 241 (see FIG. 29). In particular, the end portion of the support arm 251 includes a sleeve 262 that rotatably engages with the adjusting pivot 252. The latter is inserted into a housing 253 of the main body 241 in which it can be locked in a desired position by a fourth fixing arrangement 255, 256.

Also in this variant, the support arm 251 has, at a central portion thereof, a respective support pivot 260 on which the first wheel 9 (FIG. 28) is rotatably mounted by the interposition of a pair of rolling bearings.

The support arm 251 can be locked in a desired locking position B', with respect to the respective rotation axis W', by a resilient abutting arrangement 270 and an adjustable abutting arrangement 280.

With particular reference to FIG. 30, the resilient abutting arrangement 270 includes a stem 271 that is slidingly and resiliently connected to the main body 241 of the carriage 204 and provided with a shaped operative end 272 that is suitable for abutting, at least in the locking position B', on a roller 263 freely rotatably mounted on the end of the support arm 251 opposite the sleeve 262.

The stem 271 is inserted partially inside a fixing bush 274 provided for the purpose with a longitudinal through cavity 274a. The fixing bush 274 is inserted and screwed into a threaded through hole 243 of the main body 241. An end 273 of the stem 271 opposite the shaped operative end 272 and protruding from the fixing bush 274 has a transversal pin 275 that prevents the stem 271 protruding completely from the fixing bush 274 when not abutted on by the roller 263.

A resilient member 276, includes for example a coil spring, is inserted inside the longitudinal through cavity 274a and acts in such a manner as to push the stem 271 towards the support arm 251.

The adjustable abutting arrangement 280 includes an abutting pivot 281 connected in an adjustable manner to the main body 241 and a stroke end element 282, fixed to the support arm 251 and arranged for abutting the abutting pivot 281 in the locking position B'.

The stroke end element 282 is in particular fixed to a side appendage 261 made in the end portion of the support arm 251 that comprises the sleeve 262.

The abutting pivot 281 comprises a threaded portion screwed into a respective threaded hole 244 of the main body 241 and locked there by a pair of nuts.

In the locking position B' the support arm 251 and the first wheel 9 supported thereby are stably locked with respect to the second axis Z by virtue of the interaction of the resilient abutting arrangement 270 and of the adjustable abutting arrangement 280. By adjusting the abutting pivot 281 it is possible to adjust the locking position B'. The stroke end element 282 is maintained abutting on the abutting pivot 281—thus determining the position of the support arm 251—by the force exerted by the stem 271 pushed by the resilient member 276 against the roller 263. The shaped operative end 272 of the stem 271 in fact has a face 272a tilted in such a manner as to promote rotation of the aforementioned support arm 151, for example anticlockwise with reference to FIGS. 27 and 30.

In the locking position B' of the support arm 251, when the carriage 204 is mounted on the guide arrangement 3, the first wheel 9 is engaged with the first guide 6. The position of the first wheel 9 along the second axis Z and with respect to the second wheel 10 and the third wheel 11 ensures the correct contact of all the wheels with the respective guides with reduced clearances. In other words, the abutting pivot 281 contributes to discharging part of the force exerted by the stem 271, which therefore does not completely burden the wheel 9 and on the respective guide 6.

Figures 27, 28:
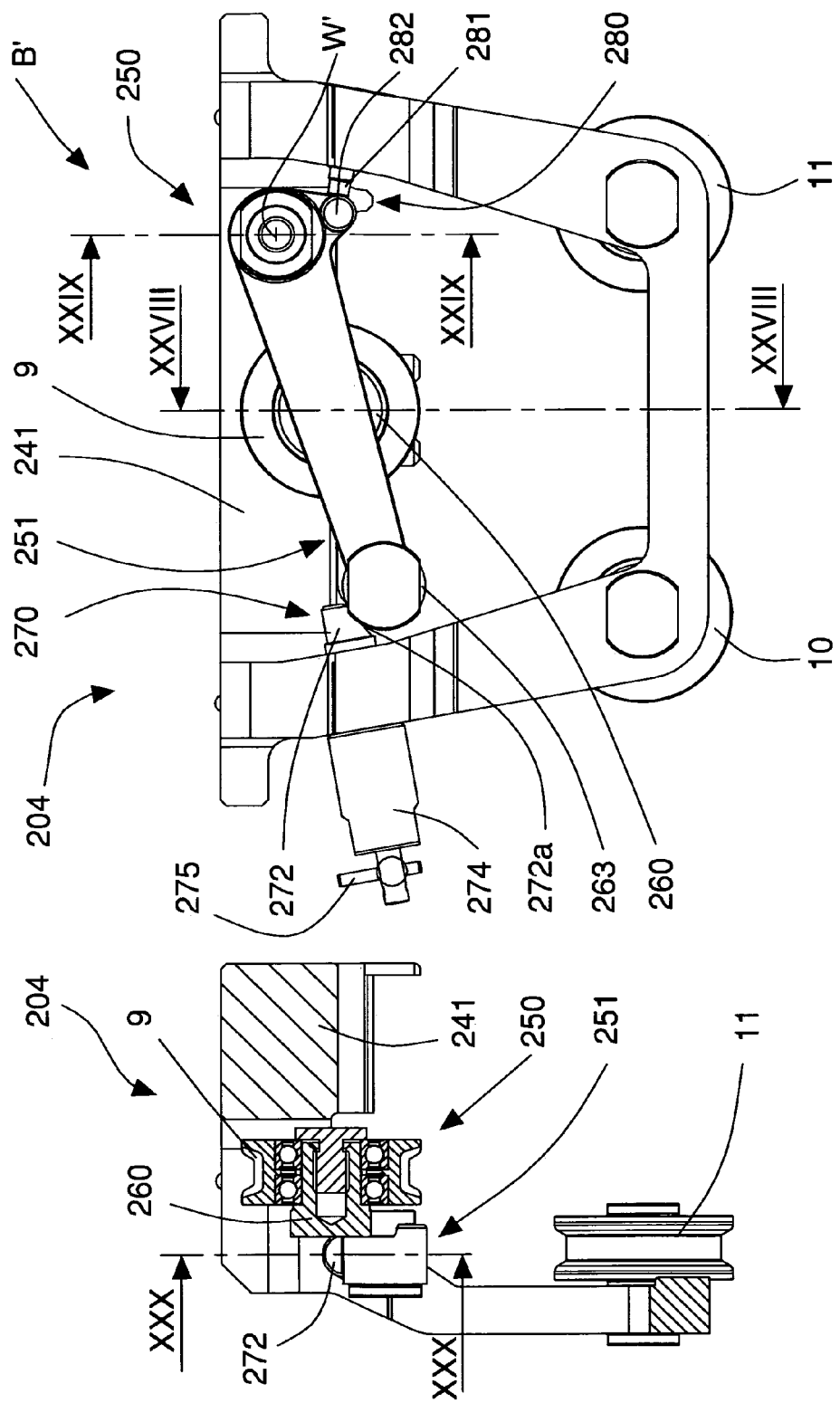
FIG. 27 is a front view of another variant of the transporting carriage of the transporting apparatus of the invention in a respective operative configuration.
FIG. 28 is a section along line XXVIII-XXVIII in FIG. 27.

Also in this variant of the transporting carriage 204 it is possible to move the stroke end element 282 away from the abutting pivot 281, and thus disengage the first wheel 9 from the first guide 6, suitably rotating the support arm 251, for example in a clockwise direction with reference to FIGS. 27 and 30.

In a first step, the operative end 272 is moved away from the roller 263, for example, by acting manually on the stem 271 by means of the transversal pin 275 to overcome the force of the resilient member 276. Once the operative end 272 and the roller 263 have been decoupled, in a second step, when the roller 263 has gone past the stem 271, the support arm 151 can be rotated completely upwards, in a disassembly position (not shown) in which the first wheel 9 is spaced apart from the first guide 6, for example, resting on the main body 241. In this disassembly position, the carriage 204 can easily and rapidly be removed by the guide arrangement 3 at any point thereof along the movement path P.

Figure 31:
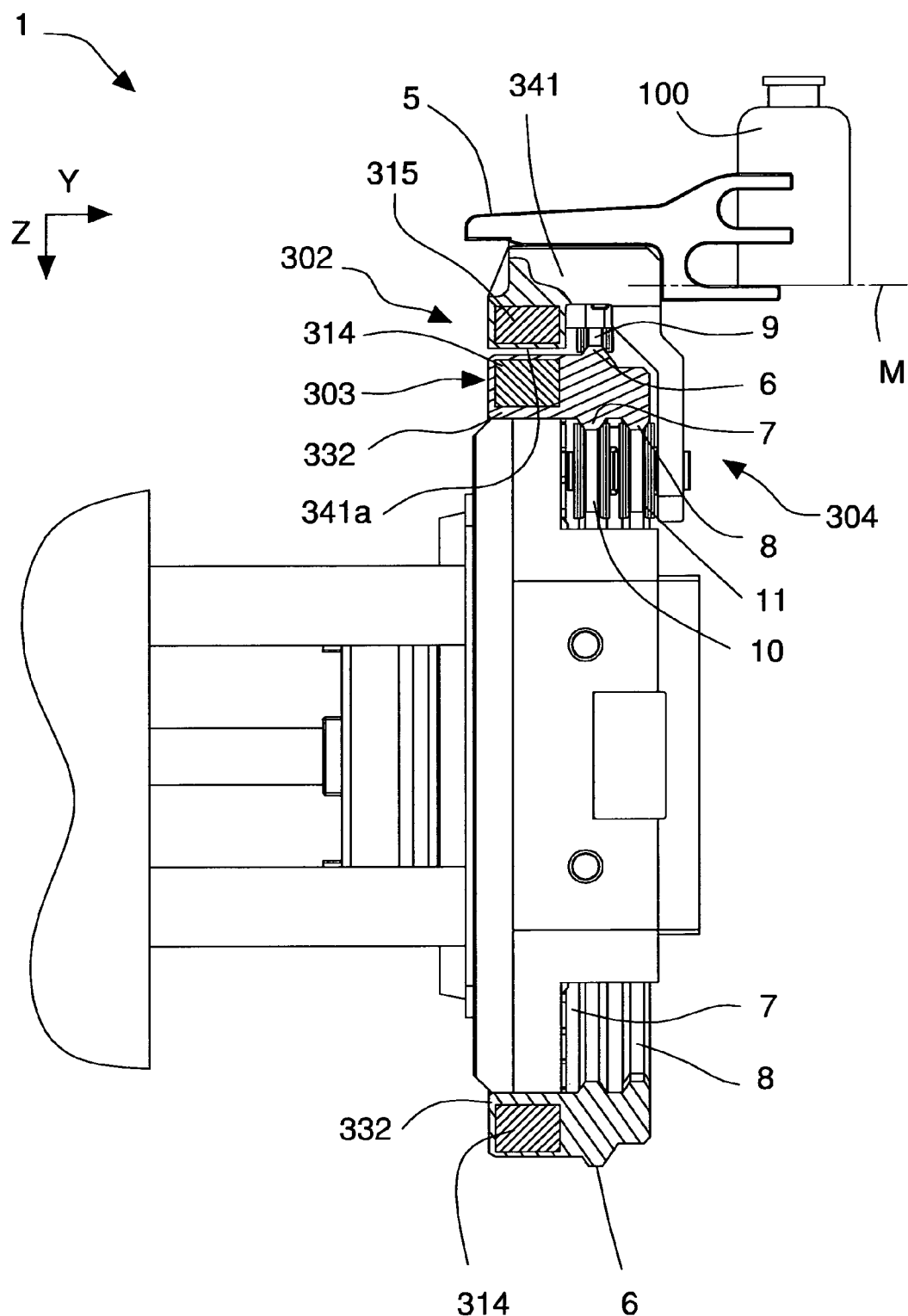
FIG. 31 is a cross section of a variant of the transporting apparatus of the invention, highlighting a magnetic type movement arrangement of for the carriage.

FIG. 31 illustrates a version of the transporting apparatus 1 of the invention that differs from the previously disclosed embodiment by the fact that the movement arrangement 302 is of the magnetic type.

In particular, the movement arrangement 302 includes a synchronous linear motor provided with a stator element 314 housed inside the guide arrangement 303 and suitable for generating an electromagnetic field interacting with a respective magnetic field generated by a permanent magnetic 315 inserted inside each carriage 304.

The movement arrangement 302 and the guide arrangement 303 define a Linear Synchronous Motor (LSM) electromagnetic transporting system, in particular of the type developed by Magnemotion Inc. and disclosed in WO 03/029651, WO 01/71684, WO 01/38124, WO 2008/005428, WO 2007/013991. The stator element includes a stator or primary 314 that is inserted inside the further guide body 332 of the guide arrangement 303 and extends over the entire length of the latter. Alternatively, the movement arrangement 302 can include a plurality of sections or motor blocks, each motor block including a stator 314 in communication with the stators 314 of the adjacent blocks, in such a manner as to supply and receive commands that coordinate the movement of the carriages 304 along the succession of motor blocks inserted inside the guide arrangement 303. Each carriage 304 is in fact provided on the lower side 341a of the main body 341 with permanent magnets 315 that generate a magnetic field that interacts with electromagnetic fields originating from the passage of alternating current in windings of the stator 314 of the linear motor. The interaction between magnetic and electromagnetic fields gives the carriage 304 a propulsive push, such that is thus moved along the guides 6, 7, 8 of the guide arrangement 303.

A control system, which is not illustrated in the figure, included, for example, in the control unit of a packaging machine with which the transporting apparatus 1 can be associated, enables a plurality of carriages 304 present on the guides 6, 7, 8 to be moved and controlled in terms of position, speed and acceleration independently and simultaneously.

Each carriage 304 further comprises a sensor or transducer, which is not illustrated, which induces a signal in the stator 314 that is detectable by the control system to determine with great precision and in real time the exact position of said carriage 304 and thus of the container or the containers 100 transported thereby. The control system is also able to avoid collisions between contiguous carriages 304 along the guides 6, 7, 8.

Each carriage 304 can be moved with different types of motion and/or movement speed along the movement path P. For example, if the transporting apparatus 1 is mounted on a packaging machine, the movement path P, at the first upper rectilinear part of the guide arrangement 303, can be divided into a plurality of operative parts, in which operative stations of the machine perform operations and/or processes on the containers 100, and of transferring parts interposed between two adjacent operative parts. In the different operative portions and/or in the transferring parts the carriage 304 can be moved with different types of motion and/or speed.

Such variant of the transporting apparatus 1 of the invention enables a guide arrangement 303 to be made having a plurality of movement paths P arranged together parallel and/or serially to move the carriages 304 selectively through respective operative stations of the operative machine and/or subsequent packaging and/or process machines.

The guide arrangement 303 can extend in such a manner as to form a closed loop of any form that is arranged on a plane that is substantially orthogonal to the sliding plane M, on which the containers 100 slide or is arranged on a plane that is substantially parallel to the aforementioned sliding plane.

Figure 32:
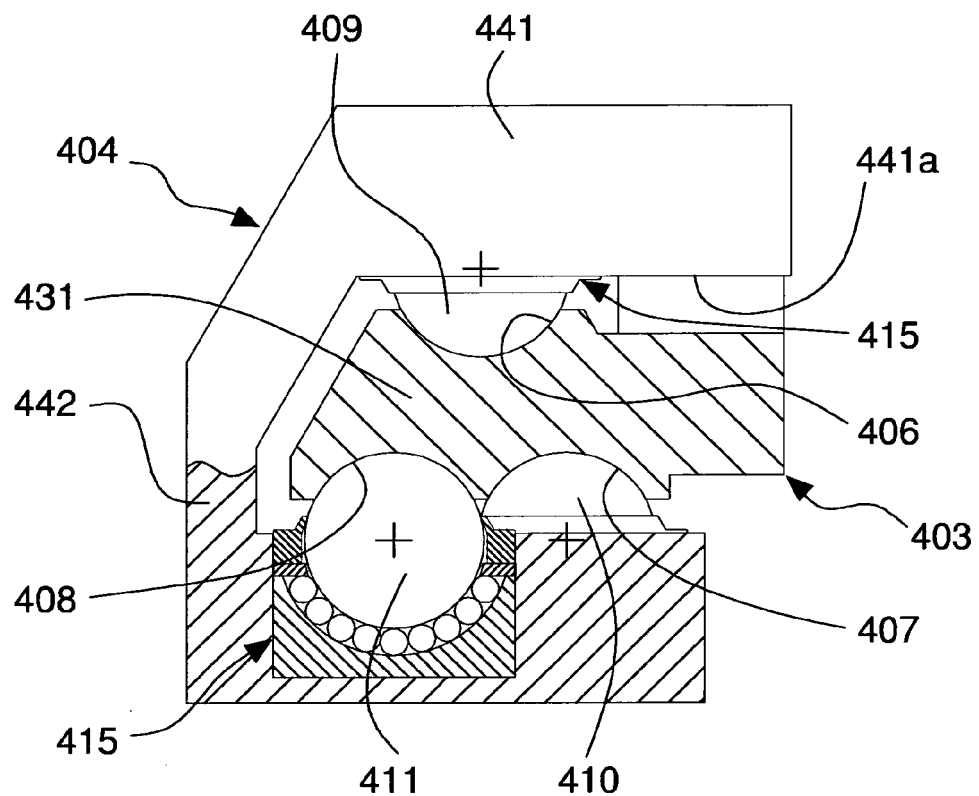
FIG. 32 is a partially sectioned schematic view of a further variant of the transporting apparatus of the invention.
Figure 33:
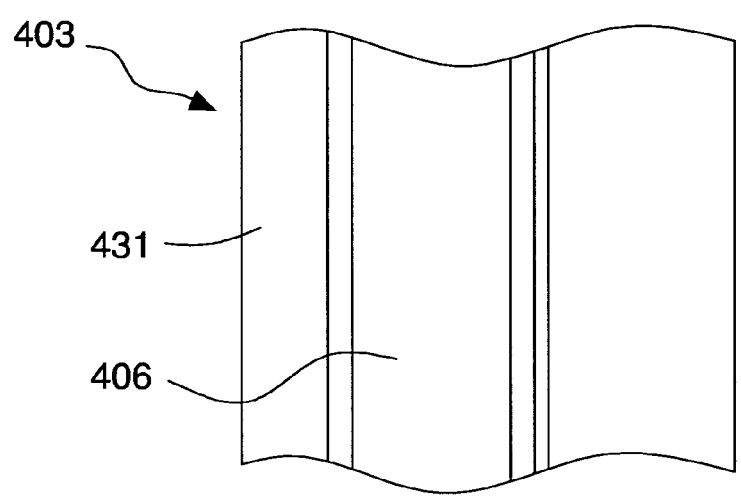
FIG. 33 is a plan view of the apparatus in FIG. 32, illustrating in particular a guide arrangement.

FIGS. 32 and 33 illustrate a further embodiment of the transporting apparatus 1 of the invention that differs from the embodiments disclosed above by the different rolling elements of the carriages 404 that include, in this case, respective support balls 409, 410, 411 that are suitable for engaging in the guide arrangement 403. The latter include guides 406, 407, 408 in the form of longitudinal grooves, directly made on the guide body 431 of the guide arrangement 403 and arranged for partially receiving the aforementioned balls 409, 410, 411 and enable free rolling thereof. Each longitudinal groove 406, 407, 408 includes a respective sliding wall having, in cross section, a circular segment shape.

The balls 409, 410, 411 are fixed to the transporting carriage 404 by suitable assembly bushes 415 of known type, comprising, for example, rolling recirculating ball mechanisms interposed between the ball 409, 410, 411 and a reinforced internal track.

The first rolling element 409 comprises a respective ball fixed by a corresponding assembly bush 415, to the lower side 441a of the main body 441 of the carriage 404. The second rolling element 410 and the third rolling element 411 comprise respective balls fixed by corresponding assembly bushes 415, to the support body 442 of the carriage 404. For this purpose, the main body 441 and the support body 442 comprise seats that are suitable for receiving the assembly bushes 415.

Also in this case, the balls 409, 410, 411, in a front view, on a plane parallel to the guides 406, 407, 408, appear arranged at the vertices of a triangle, in particular an isosceles triangle. In particular, the instantaneous rotation axes of the balls 409, 410, 411 define, on said parallel plane, the vertices of a triangle. In other words, the balls 409, 410, 411, in a front view, on a plane parallel to the guides 406, 407, 408, and perpendicular to the instantaneous rotation axes of the balls 409, 410, 411 appear arranged at the vertices of a triangle, in particular an isosceles triangle.

Such embodiment of the transporting apparatus 1 enables further advantages to be obtained, in particular greater constructional simplification of the guides 406, 407, 408 that, comprising longitudinal grooves that are directly obtainable by mechanical machining on the guide body 431, are faster, simpler and cheaper to make. Further, the balls 409, 410, 411 with the respective assembly bushes 415 can be assembled on or disassembled from the carriage 404 rapidly and simply.

The disclosed transporting apparatuses can be modified without falling outside the scope of the invention. In a variant that is not illustrated, the guide arrangement can include guides arranged in a different manner on the guide body with respect to the illustrated variants, for example, they can be arranged in an angularly equidistant manner and be arranged according to radial distances with respect to the same guide body. The carriages thus include wheels that are suitable for being coupled with the respective guides, in particular wheels with axes that are perpendicular to the radial directions of the guides.

The invention claimed is:

1. An apparatus for transporting objects, comprising a guide arrangement for supporting and guiding along a movement path at least one carriage supporting a support element suitable for receiving at least one object, and a movement arrangement for moving said carriage along said movement path, wherein said at least one carriage includes a plurality of rolling elements and an adjusting device for rotatably supporting at least one rolling element of said rolling elements and adjusting a position of said at least one rolling element along first and second orthogonal directions and wherein said guide arrangement comprises at least three guides that are parallel to one another, each of which is arranged for supporting and guiding a respective rolling element in an operative configuration of said carriage, said guides defining respective movement profiles conjugated and shaped so as each rolling element abuts on the respective guide in each point of the latter along said movement path, said rolling elements being arranged, with respect to a plane that is parallel to said guides, at the vertices of a triangle.

2. An apparatus according to claim 1, wherein said guides comprise at least a first guide, a second guide and a third guide that respectively support and guide a first rolling element, a second rolling element and a third rolling element of said carriage, said first guide being opposite said second guide and said third guide, said second guide and said third guide being substantially side by side.

3. An apparatus according to claim 1, wherein said rolling elements are arranged, with respect to said plane parallel to said guides, at the vertices of an isosceles triangle.

4. An apparatus to claim 1, wherein each rolling element comprises a respective fixed axis wheel or a respective ball.

5. An apparatus according to claim 1, wherein said movement profiles comprise respective rectilinear portions and respective curved portions; respective joining portions being interposed between, and joining, said rectilinear portions and said curved portions, or curved portions with different bending radii.

6. An apparatus according to claim 5, wherein, as the carriage moves, the rolling elements pass through the respective joining portions substantially in a same time.

7. An apparatus according to claim 1, wherein said guide arrangement further comprises at least one assembly portion that is removable for disengaging one of said rolling elements from the respective guide and for removing said carriage from said guide arrangement.

8. An apparatus according to claim 7, wherein said movement profiles comprise respective rectilinear portions and respective curved portions; respective joining portions being interposed between, and joining, said rectilinear portions and said curved portions, or curved portions with different bending radii and said assembly portion comprises a joining portion of the movement profile of one of said guides.

9. An apparatus according to claim 1, wherein said adjusting device comprises an adjusting element connected to a main body of said carriage so as to be adjustable in position along said second direction, the adjusting element slidingly housing a support pivot rotatably supporting said rolling element, said support pivot being adjustable in position with respect to said adjusting element along said first direction.

10. An apparatus according to claim 1, wherein said adjusting device comprises a support arm rotatably connected to a main body of the carriage in an adjustable position along said first direction, the support arm being suitable for rotatably supporting said rolling element.

11. An apparatus according to claim 10, wherein said support arm is movable in rotation around a rotation axis between a locking position, in which said rolling element in said operative configuration abuts and engages the respective guide, and a release condition in which said rolling element is disengaged and/or spaced apart from the respective guide.

12. An apparatus according to claim 11, and further comprising a resilient abutting arrangement and an adjustable abutting arrangement arranged for reversingly locking said support arm in said locking position and for adjusting in a desired manner said locking position, whereby an angular position of said support arm is adjusted around the rotation axis and a position of said rolling element along said second direction.

13. An apparatus according to claim 1, wherein said movement arrangement comprises a belt wound in a loop around, and driven by, pulley elements.

14. An apparatus according to claim 1, wherein said movement arrangement is of electromagnetic type and comprises at least one linear synchronous motor provided with a stator element housed inside said guide arrangement and suitable for generating an electromagnetic field interacting with a respective magnetic field generated by means of a permanent magnet inserted inside said at least one carriage.

15. A machine for packaging objects, in particular pharmaceutical and/or cosmetic and/or food containers, comprising a plurality of operative stations for carrying out operations and/or processes on said objects and a transporting apparatus a guide arrangement for supporting and guiding along a movement path at least one carriage supporting a support element suitable for receiving at least one object, and a movement arrangement for moving said carriage along said movement path, wherein said at least one carriage includes a plurality of rolling elements and an adjusting device for rotatably supporting at least one rolling element of said rolling elements and adjusting a position of said at least one rolling element along first and second orthogonal directions and wherein said guide arrangement comprises at least three guides that are parallel to one another, each of which is arranged for supporting and guiding a respective rolling element in an operative configuration of said carriage, said guides defining respective movement profiles conjugated and shaped so as each rolling element abuts on the respective guide in each point of the latter along said movement path, said rolling elements being arranged, with respect to a plane that is parallel to said guides, at the vertices of a triangle.

* * * * *